US012520235B2

United States Patent
Damnjanovic et al.

(10) Patent No.: US 12,520,235 B2
(45) Date of Patent: Jan. 6, 2026

(54) CONFIGURATION FOR SECONDARY CELL DORMANCY INDICATIONS

(71) Applicant: QUALCOMM Incorporated, San Diego, CA (US)

(72) Inventors: Jelena Damnjanovic, Del Mar, CA (US); Wooseok Nam, San Diego, CA (US); Tao Luo, San Diego, CA (US); Linhai He, San Diego, CA (US); Peter Gaal, San Diego, CA (US); Juan Montojo, San Diego, CA (US); Peter Pui Lok Ang, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/096,089

(22) Filed: Nov. 12, 2020

(65) Prior Publication Data

US 2021/0153116 A1 May 20, 2021

Related U.S. Application Data

(60) Provisional application No. 62/937,065, filed on Nov. 18, 2019.

(51) Int. Cl.
*H04W 52/02* (2009.01)
(52) U.S. Cl.
CPC ................ *H04W 52/0206* (2013.01)
(58) Field of Classification Search
CPC ... H04W 52/0206; H04W 76/28; Y02D 30/70

(Continued)

(56) References Cited

U.S. PATENT DOCUMENTS

2014/0120893 A1* 5/2014 Malladi ............. H04W 52/0206
455/418
2015/0208269 A1* 7/2015 Damnjanovic ....... H04L 1/0026
370/252

(Continued)

FOREIGN PATENT DOCUMENTS

WO WO-2021092861 A1 * 5/2021

OTHER PUBLICATIONS

International Search Report and Written Opinion—PCT/US2020/060377—ISA/EPO—Feb. 11, 2021.

(Continued)

*Primary Examiner* — Charles N Appiah
*Assistant Examiner* — Nicole M Louis-Fils
(74) *Attorney, Agent, or Firm* — Holland & Hart LLP

(57) ABSTRACT

Methods, systems, and devices for wireless communications are described. Generally, the described techniques at a user equipment (UE) provide for efficiently identifying a dormancy state of a secondary cell (SCell) configured for communications with a base station. A UE may be configured with a duration of time for which an SCell is to be in an indicated dormancy state. Accordingly, when the UE receives an indication of a dormancy state for an SCell, the UE may determine that the SCell is in the indicated dormancy state for the duration of time. The UE may also be configured with a default dormancy state of the SCell. Thus, after the duration of time expires, the UE may determine that the SCell is in the default dormancy state (e.g., the UE may fall back to the default dormancy of the SCell after the duration of time expires).

25 Claims, 14 Drawing Sheets

(58) Field of Classification Search
USPC .......................................................... 370/311
See application file for complete search history.

(56) References Cited

U.S. PATENT DOCUMENTS

| | | | | |
|---|---|---|---|---|
| 2015/0304915 | A1* | 10/2015 | Uchino | H04W 76/36 |
| | | | | 370/329 |
| 2016/0066255 | A1 | 3/2016 | Marinier et al. | |
| 2016/0309398 | A1* | 10/2016 | Xue | H04W 68/00 |
| 2018/0007731 | A1* | 1/2018 | Park | H04L 5/001 |
| 2019/0021052 | A1 | 1/2019 | Kadiri et al. | |
| 2019/0103954 | A1 | 4/2019 | Lee et al. | |
| 2019/0124558 | A1 | 4/2019 | Ang et al. | |
| 2019/0200413 | A1 | 6/2019 | Hong | |
| 2019/0208429 | A1* | 7/2019 | Hong | H04L 5/00 |
| 2019/0254110 | A1 | 8/2019 | He et al. | |
| 2019/0306739 | A1* | 10/2019 | Kim | H04L 5/0096 |
| 2020/0092814 | A1* | 3/2020 | Zhou | H04L 5/0098 |
| 2020/0112919 | A1* | 4/2020 | Nam | H04B 7/0617 |
| 2020/0229082 | A1* | 7/2020 | Jang | H04W 16/08 |
| 2021/0029772 | A1* | 1/2021 | Islam | H04L 1/1896 |
| 2021/0227409 | A1* | 7/2021 | Siomina | H04B 7/0617 |
| 2022/0006599 | A1* | 1/2022 | Wang | H04L 27/26025 |
| 2022/0116874 | A1* | 4/2022 | Xu | H04W 52/0225 |
| 2022/0225151 | A1* | 7/2022 | Zhang | H04W 52/0229 |
| 2022/0303899 | A1* | 9/2022 | Ma | H04W 52/0235 |

OTHER PUBLICATIONS

Qualcomm Incorporated: "Fast SCell Activation and SCell Dormancy", 3GPP Tsg-Ran WG1 #98bis, Draft; R1-1911139 Fast SCell Activation and SCell Dormancy, 3rd Generation Partnership Project (3GPP), Mobile Competence Centre; 650, Route Des Lucioles; F-06921 Sophia-Antipolis Cedex; FRANCE vol. Ran WG1, No. Chongqing, China; Oct. 14, 2019-Oct. 20, 2019 Oct. 5, 2019 (Oct. 5, 2019), XP051808862, 18 pages, Retrieved from the Internet: URL: https://ftp.3gpp.org/tsg_ran/WG1_RL1/TSGR1_98b/Docs/R1-1911139.zip R1-1911139 Fast SCell activation and SCell dormancy. docx [retrieved on Oct. 5, 2019] p. 1-p. 17.

Qualcomm Incorporated: "UE Adaptation to the Traffic and UE Power Consumption Characteristics," 3GPP Draft, 3GPP TSG-RAN WG1 Meeting #95, R1-1813447, UE Adaptation for Power Saving, 3RD Generation Partnership Project (3GPP), Mobile Competence Centre, 650, Route Des Lucioles, F-06921, Sophia-Antipolis Cedex, France, vol. RAN WG1, No. Spokane, Washington, USA, Nov. 12, 2018-Nov. 16, 2018, Nov. 3, 2018, XP051555486, 20 Pages, Retrieved from the Internet: URL: http://www.3gpp.org/ftp/Meetings%5F3GPP%5FSYNC/RAN1/Docs/R1%2D1813447%2Ezip [retrieved on Nov. 11, 2018], Section 5.2, Section 4.3.2, the whole document.

Intel Corporation: "Discussion on Fast Scell Activation and Deactivation", 3GPP TSG RAN WG1 Meeting #99, R1-1912234, Reno, USA, Nov. 18, 2019-Nov. 22, 2019, 5 Pages, Nov. 9, 2019.

Qualcomm Incorporated: "SCell Dormancy and Fast SCell Activation," 3GPP TSG-RAN WG1 #99, R1-1912980, 3rd Generation Partnership Project, Mobile Competence Centre, 650, Route Des Lucioles, F-06921, Sophia-Antipolis Cedex, France, vol. RAN WG1. No. Reno. USA, Nov. 18, 2019-Nov. 22, 2019, Nov. 9, 2019, XP051823742, pp. 1-13, The whole document.

Qualcomm Incorporated: "Fast SCell Activation and SCell Dormancy", 3GPP TSG-RAN WG1 #98bis, R1-1911139, Chongqing, China, Oct. 14, 2019-Oct. 20, 2019, Oct. 10, 2019, pp. 1-18.

* cited by examiner

CONFIGURATION FOR SECONDARY CELL DORMANCY INDICATIONS

CROSS REFERENCE

The present Application for Patent claims the benefit of U.S. Provisional Patent Application No. 62/937,065 by DAMNJANOVIC et al., entitled "CONFIGURATION FOR SECONDARY CELL DORMANCY INDICATIONS," filed Nov. 18, 2019, assigned to the assignee hereof, and expressly incorporated by reference herein.

BACKGROUND

The following relates generally to wireless communications and more specifically to configuration for secondary cell (SCell) dormancy indications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may support communications between a UE and a base station on multiple cells, including a primary cell (PCell), a primary secondary cell (PSCell), and one or more SCells. In such systems, the base station may actively communicate with the UE on a subset of the SCells to adapt to traffic patterns, and the other SCells may be dormant for communications between the base station and the UE. Improved techniques for indicating the dormancy state of SCells (e.g., whether the SCells are active or dormant) may be desirable.

SUMMARY

The described techniques relate to improved methods, systems, devices, and apparatuses that support configuration for secondary cell (SCell) dormancy indications. Generally, the described techniques at a user equipment (UE) provide for efficiently identifying a dormancy state of an SCell configured for communications with a base station (e.g., even when the UE has not received an indication (dynamic indication) of the dormancy state of the SCell). As described herein, a UE may be configured with a duration of time for which an SCell is to be in an indicated dormancy state. Accordingly, when the UE receives an indication of a dormancy state of an SCell, the UE may determine that the SCell is in the indicated dormancy state for the duration of time. The UE may also be configured with a default dormancy state of the SCell. Thus, after the duration of time expires, the UE may determine that the SCell is in the default dormancy state (e.g., the UE may fall back to the default dormancy state of the SCell after the duration of time expires).

A method of wireless communication at a UE is described. The method may include receiving, from a base station, an indication of a dormancy state of a secondary cell, the dormancy state indicating whether the secondary cell is dormant or active for communications between the UE and the base station, identifying a duration of time for which the secondary cell is to be in the indicated dormancy state, and communicating with the base station based on the indicated dormancy state of the secondary cell.

An apparatus for wireless communication at a UE is described. The apparatus may include a processor, memory coupled with the processor, and instructions stored in the memory. The instructions may be executable by the processor to cause the apparatus to receive, from a base station, an indication of a dormancy state of a secondary cell, the dormancy state indicating whether the secondary cell is dormant or active for communications between the UE and the base station, identify a duration of time for which the secondary cell is to be in the indicated dormancy state, and communicate with the base station based on the indicated dormancy state of the secondary cell.

Another apparatus for wireless communication at a UE is described. The apparatus may include means for receiving, from a base station, an indication of a dormancy state of a secondary cell, the dormancy state indicating whether the secondary cell is dormant or active for communications between the UE and the base station, identifying a duration of time for which the secondary cell is to be in the indicated dormancy state, and communicating with the base station based on the indicated dormancy state of the secondary cell.

A non-transitory computer-readable medium storing code for wireless communication at a UE is described. The code may include instructions executable by a processor to receive, from a base station, an indication of a dormancy state of a secondary cell, the dormancy state indicating whether the secondary cell is dormant or active for communications between the UE and the base station, identify a duration of time for which the secondary cell is to be in the indicated dormancy state, and communicate with the base station based on the indicated dormancy state of the secondary cell.

Some examples of the method, apparatuses, and non-transitory computer-readable medium described herein may further include operations, features, means, or instructions for receiving, from the base station, signaling indicating the duration of time for which the secondary cell may be to be in the indicated dormancy state. Some examples of the method, apparatuses, and non-transitory computer-readable medium described herein may further include operations, features, means, or instructions for identifying a default dormancy state of the secondary cell, and determining that the secondary cell may be in the default dormancy state after the duration of time may have expired, where the default dormancy state may be dormant or active. Some examples of the method, apparatuses, and non-transitory computer-readable medium described herein may further include operations, features, means, or instructions for receiving, from the base station, signaling indicating the default dormancy state of the secondary cell.

In some examples of the method, apparatuses, and non-transitory computer-readable medium described herein, receiving the indication of the dormancy state of the secondary cell may include operations, features, means, or instructions for receiving wake-up signaling indicating the dormancy state of the secondary cell. In some examples of the method, apparatuses, and non-transitory computer-readable medium described herein, receiving the indication of the dormancy state of the secondary cell may include operations, features, means, or instructions for receiving downlink control information on a primary cell or a primary secondary cell indicating the dormancy state of the secondary cell. In some examples of the method, apparatuses, and non-transitory computer-readable medium described herein, the duration of time for which the secondary cell is to be in the indicated dormancy state is configured for a timer. Some examples of the method, apparatuses, and non-transitory computer-readable medium described herein may further include operations, features, means, or instructions for starting the timer upon receiving the indication of the dormancy state of the secondary cell, and falling back to a default dormancy state of the secondary cell when the timer expires.

In some examples of the method, apparatuses, and non-transitory computer-readable medium described herein, the duration of time for which the secondary cell is to be in the indicated dormancy state is a number of on-durations of a discontinuous reception cycle. Some examples of the method, apparatuses, and non-transitory computer-readable medium described herein may further include operations, features, means, or instructions for starting a counter for on-durations of the discontinuous reception cycle upon receiving the indication of the dormancy state of the secondary cell, and falling back to a default dormancy state of the secondary cell at an end of a last on-duration after the counter reaches the number of on-durations of the discontinuous reception cycle.

In some examples of the method, apparatuses, and non-transitory computer-readable medium described herein, the duration of time for which the secondary cell is to be in the indicated dormancy state is a single, next on-duration of a discontinuous reception cycle. Some examples of the method, apparatuses, and non-transitory computer-readable medium described herein may further include operations, features, means, or instructions for falling back to the default dormancy state of the secondary cell at an end of the single, next on-duration of the discontinuous reception cycle. Some examples of the method, apparatuses, and non-transitory computer-readable medium described herein may further include operations, features, means, or instructions for determining that the secondary cell may be in the indicated dormancy state until the UE receives another indication of another dormancy state of the secondary cell.

In some examples of the method, apparatuses, and non-transitory computer-readable medium described herein, the indication of the dormancy state of the secondary cell includes a first indication, and the indicated dormancy state includes a first dormancy state. Some examples of the method, apparatuses, and non-transitory computer-readable medium described herein may further include operations, features, means, or instructions for receiving a second indication of a second dormancy state of the secondary cell, where the second indication overrides the first indication, and determining that the secondary cell may be in the second dormancy state based on receiving the second indication.

In some examples of the method, apparatuses, and non-transitory computer-readable medium described herein, the indicated dormancy state is dormant. Some examples of the method, apparatuses, and non-transitory computer-readable medium described herein may further include operations, features, means, or instructions for determining that the secondary cell may be dormant for communications between the UE and the base station for at least the identified duration of time. In some examples of the method, apparatuses, and non-transitory computer-readable medium described herein, the indicated dormancy state is active. Some examples of the method, apparatuses, and non-transitory computer-readable medium described herein may further include operations, features, means, or instructions for determining that the secondary cell may be active for communications between the UE and the base station for at least the identified duration of time.

A method of wireless communication at a base station is described. The method may include transmitting, to a UE, signaling indicating a duration of time for which a secondary cell is to be in a dormancy state, determining the dormancy state of the secondary cell, the dormancy state indicating whether the secondary cell is dormant or active for communications between the UE and the base station, transmitting, to the UE, an indication of the dormancy state of the secondary cell based on the determining, and communicating with the UE based on the indicated dormancy state of the secondary cell.

An apparatus for wireless communication at a base station is described. The apparatus may include a processor, memory coupled with the processor, and instructions stored in the memory. The instructions may be executable by the processor to cause the apparatus to transmit, to a UE, signaling indicating a duration of time for which a secondary cell is to be in a dormancy state, determine the dormancy state of the secondary cell, the dormancy state indicating whether the secondary cell is dormant or active for communications between the UE and the base station, transmit, to the UE, an indication of the dormancy state of the secondary cell based on the determining, and communicate with the UE based on the indicated dormancy state of the secondary cell.

Another apparatus for wireless communication at a base station is described. The apparatus may include means for transmitting, to a UE, signaling indicating a duration of time for which a secondary cell is to be in a dormancy state, determining the dormancy state of the secondary cell, the dormancy state indicating whether the secondary cell is dormant or active for communications between the UE and the base station, transmitting, to the UE, an indication of the dormancy state of the secondary cell based on the determining, and communicating with the UE based on the indicated dormancy state of the secondary cell.

A non-transitory computer-readable medium storing code for wireless communication at a base station is described. The code may include instructions executable by a processor to transmit, to a UE, signaling indicating a duration of time for which a secondary cell is to be in a dormancy state, determine the dormancy state of the secondary cell, the dormancy state indicating whether the secondary cell is dormant or active for communications between the UE and the base station, transmit, to the UE, an indication of the dormancy state of the secondary cell based on the determining, and communicate with the UE based on the indicated dormancy state of the secondary cell.

Some examples of the method, apparatuses, and non-transitory computer-readable medium described herein may further include operations, features, means, or instructions for transmitting, to the UE, signaling indicating a default dormancy state of the secondary cell, where the default dormancy state may be dormant or active. In some examples of the method, apparatuses, and non-transitory computer-readable medium described herein, transmitting the indication of the dormancy state of the secondary cell may include operations, features, means, or instructions for transmitting wake-up signaling indicating the dormancy state of the secondary cell. In some examples of the method, apparatuses, and non-transitory computer-readable medium described herein, transmitting the indication of the dormancy state of the secondary cell may include operations, features, means, or instructions for transmitting downlink control information on a primary cell or a primary secondary cell indicating the dormancy state of the secondary cell.

In some examples of the method, apparatuses, and non-transitory computer-readable medium described herein, the duration of time for which the secondary cell may be to be in the indicated dormancy state may be configured for a timer. In some examples of the method, apparatuses, and non-transitory computer-readable medium described herein, the duration of time for which the secondary cell may be to be in the indicated dormancy state may be a number of on-durations of a discontinuous reception cycle at the UE. In some examples of the method, apparatuses, and non-transitory computer-readable medium described herein, the duration of time for which the secondary cell may be to be in the indicated dormancy state may be a single, next on-duration of a discontinuous reception cycle at the UE.

In some examples of the method, apparatuses, and non-transitory computer-readable medium described herein, the duration of time for which the secondary cell may be to be in an indicated dormancy state may be until further notice. In some examples of the method, apparatuses, and non-transitory computer-readable medium described herein, the indication of the dormancy state of the secondary cell includes a first indication, and the indicated dormancy state includes a first dormancy state. Some examples of the method, apparatuses, and non-transitory computer-readable medium described herein may further include operations, features, means, or instructions for transmitting a second indication of a second dormancy state of the secondary cell, where the second indication overrides the first indication. In some examples of the method, apparatuses, and non-transitory computer-readable medium described herein, the indicated dormancy state may be dormant or active.

DETAILED DESCRIPTION

Figure 1:
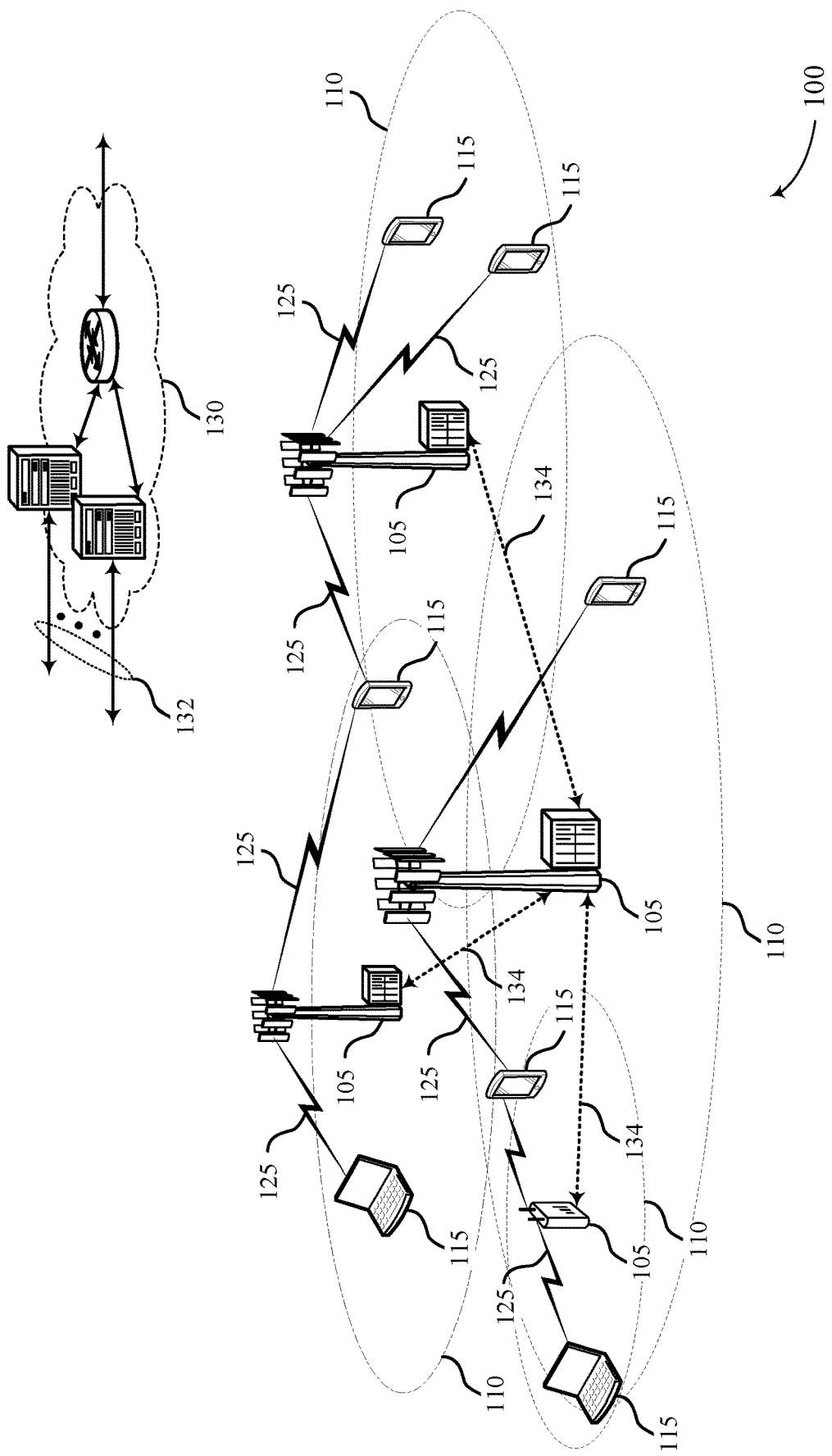
FIG. 1 illustrates an example of a wireless communications system that supports configuration for secondary cell (SCell) dormancy indications in accordance with aspects of the present disclosure.

Some wireless communications systems may support communications between a user equipment (UE) and a base station on multiple cells (e.g., a primary cell (PCell), a primary secondary cell (PSCell), or one or more secondary cells (SCells)). The use of multiple cells may allow a base station to increase the bandwidth used to communicate with a UE. For instance, the base station may communicate with the UE on the multiple cells on multiple aggregated carriers, a feature referred to as carrier aggregation (e.g., where the UE communicates with each cell at the base station on a separate carrier). To provide additional flexibility, the base station may be configured to deactivate one or more SCells or transition the one or more SCells to a dormant state to adapt to traffic patterns associated with communications with a UE. Specifically, the base station may transmit a dormancy indication to a UE to indicate whether an SCell is active or dormant for communications with the base station. In some cases, however, the base station may not be able to indicate the dormancy state of an SCell to a UE, and the UE may not be able to determine whether to communicate with the base station on the SCell. As a result, if a UE avoids communicating with a base station on an active SCell, a wireless communications system may experience throughput loss. Alternatively, if the UE attempts to communicate with the base station on a dormant SCell, the UE may waste power.

As described herein, a wireless communications system may support efficient techniques for configuring a UE to identify a dormancy state of an SCell (e.g., even when the UE has not received an indication of the dormancy state of the SCell). In particular, using the techniques described herein, a UE and a base station may be able to synchronize on determining whether an SCell is active or dormant for communications between the UE and the base station. Before receiving an indication of a dormancy state of an SCell, a UE may be configured (e.g., explicitly configured via higher layer signaling or preconfigured) with a duration of time for which an SCell is to be in an indicated dormancy state. Accordingly, when the UE receives an indication of a dormancy state of the SCell, the UE may determine that the SCell is in the indicated dormancy state for the duration of time. The UE may also be configured (e.g., explicitly configured via higher layer signaling or preconfigured) with a default dormancy state of the SCell. Thus, after the duration of time expires, the UE and the base station may determine that the SCell is in the default dormancy state (e.g., the SCell may fall back to the default dormancy state after the duration of time expires).

Aspects of the disclosure introduced above are described below in the context of a wireless communications system. Examples of processes and signaling exchanges that support configuration for SCell dormancy indications are then described. Aspects of the disclosure are further illustrated by and described with reference to apparatus diagrams, system diagrams, and flowcharts that relate to configuration for SCell dormancy indications.

FIG. 1 illustrates an example of a wireless communications system 100 that supports configuration for SCell dormancy indications in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a predefined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode) or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers. Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Wireless communications system 100 may support communications between a base station 105 and a UE 115 on multiple cells or carriers (e.g., a PCell, PSCell, and one or more SCells), a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers. The use of carrier aggregation may allow a base station 105 to increase the bandwidth used to communicate with a UE 115. To provide additional flexibility, the base station 105 may be configured to deactivate one or more SCells or transition the one or more SCells to a dormant state to adapt to traffic patterns associated with communications with a UE. Specifically, a base station 105 may transmit a dormancy indication to a UE 115 to indicate whether an SCell is active or dormant for communications between the UE 115 and the base station 105 (i.e., for triggering dormancy-like behavior of SCells). An active SCell may refer to an SCell over which a base station 105 or UE 115 may transmit or receive data or control information, and a dormant SCell may refer to an SCell over which a base station 105 or UE 115 may avoid transmitting and receiving data or control information.

In some cases, when a UE 115 is operating in a discontinuous reception (DRX) mode, the message used to transmit the dormancy indication may depend on whether the UE 115 is inside or outside of a DRX active time (e.g., on-duration). For instance, when the UE 115 is outside a DRX active time (e.g., in an off-duration of a DRX cycle), the base station 105 may transmit the dormancy indication to the UE 115 in a wake-up signal (WUS) in a PDCCH (e.g., where the WUS may indicate that the UE 115 is to transition to a wake state for a next on-duration in a DRX cycle). That is, an explicit information field for the UE 115 may be introduced to the PDCCH WUS for transitioning from dormancy-like to non-dormancy-like behavior on activated SCells. Alternatively, when the UE 115 is within a DRX active time (e.g., in an on-duration of a DRX cycle), the base station 105 may transmit the dormancy indication to the UE 115 in downlink control information (DCI) on a PCell or PSCell. That is, an explicit information field may be introduced to, at least, DCI format 0-1 and DCI format 1-1 on the PCell or PSCell for transitioning between dormancy-like and non-dormancy-like behavior on activated SCells. Thus, the transition of a dormancy state triggered outside the DRX active time may be one-directional (e.g., from dormant to active), and the transition of the dormancy state triggered within the DRX active time may be bi-directional (e.g., from dormant to active or active to dormant).

In the examples described above, a base station 105 may transmit a control message to a UE 115 indicating the dormancy state of an SCell. In other examples, however, a base station 105 may not be able to indicate the dormancy state of an SCell to a UE 115. For instance, a WUS may not be configured, or a WUS may be configured without a field for a dormancy indication (e.g., SCell dormancy behavior indication by WUS may not be configured), and, as a result, no SCell dormancy behavior indication may be transmitted outside a DRX active time. Additionally, after a UE 115 enters a DRX active time, and before the UE 115 receives an SCell dormancy indication (e.g., in DCI), the UE 115 may not be configured with a dormancy state of the SCell. Accordingly, when the UE 115 fails to receive an indication of a dormancy state of an SCell from a base station 105, the UE 115 may not be able to determine whether to communicate with the base station 105 on the SCell. If the UE 115 avoids communicating with the base station 105 on an active SCell, a wireless communications system may experience throughput loss. Alternatively, if the UE 115 attempts to communicate with the base station 105 on a dormant SCell, the UE 115 may waste power. Wireless communications system 100 may support efficient techniques for configuring a UE 115 to identify a dormancy state of an SCell (e.g., even when the UE 115 has not received an indication of the dormancy state of the SCell).

Figure 2:
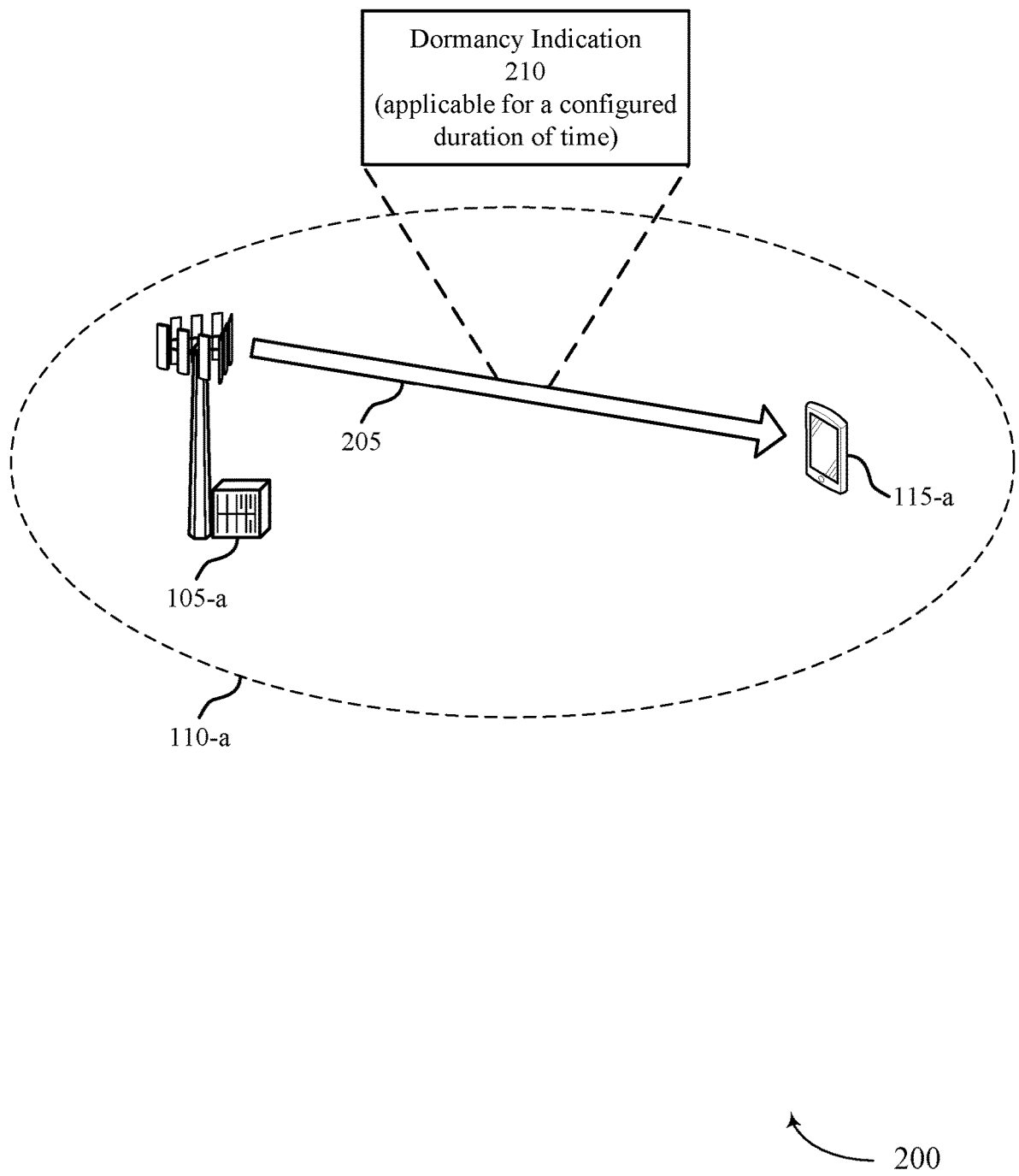
FIG. 2 illustrates an example of a wireless communications system in accordance with aspects of the present disclosure.

FIG. 2 illustrates an example of a wireless communications system 200 that supports configuration for SCell dormancy indications in accordance with aspects of the present disclosure. The wireless communications system 200 includes a UE 115-a, which may be an example of a UE 115 described with reference to FIG. 1. The wireless communications system 200 also includes a base station 105-a, which may be an example of a base station 105 described with reference to FIG. 1. The base station 105-a may provide communication coverage for a coverage area 110-a. For example, the base station 105-a may transmit downlink signals to the UE 115-a in coverage area 110-a on resources of a carrier 205. The wireless communications system 200 may implement aspects of wireless communications system 100. For example, the wireless communications system 200 may support efficient techniques for configuring the UE 115-a to identify a dormancy state of an SCell (e.g., even when the UE 115 has not received an indication of the dormancy state of the SCell).

In the example of FIG. 2, the UE 115-a may receive an SCell dormancy configuration from the base station 105-a indicating parameters for identifying the dormancy state of different SCells or different groups of SCells. In accordance with the techniques described herein, the UE 115-a may also be configured with a default dormancy state of each SCell or group of SCells (e.g., default SCell behavior which may be either dormancy-like or non-dormancy-like behavior) or a time duration for which an SCell or group of SCells are to be in an indicated dormancy state. The base station 105-a may transmit signaling to the UE 115-a indicating the default dormancy state of each SCell or group of SCells or indicating a time duration for which an SCell or group of SCells are to be in an indicated dormancy state. Alternatively, the UE 115-a may be preconfigured with a default dormancy state of each SCell or group of SCells or preconfigured with a time duration for which the SCell or group of SCells are to be in an indicated dormancy state. In some cases, if the default dormancy state of an SCell or group of SCells is not signaled to the UE 115-a (e.g., the default SCell behavior is not explicitly configured in signaling), the UE 115-a may determine that the SCell or group of SCells are dormant (e.g., dormancy-like behavior may be assumed for improved power saving).

As described with reference to FIG. 1, the base station 105-a may transmit a dormancy indication 210 that indicates a dormancy state of an SCell to the UE 115-a (e.g., in a WUS or in DCI). The UE 115-a may receive the dormancy indication 210 and identify the dormancy state of the SCell, and the UE 115-a may determine that the SCell is in the indicated dormancy state for the time duration configured for the SCell (e.g., the time duration for which the SCell is to be in the indicated dormancy state). If the UE 115-a receives another dormancy indication indicating another dormancy state of the SCell within the configured duration of time, the UE 115-a may determine that the SCell is in the other indicated dormancy state (i.e., the latest indicated dormancy state may override previously indicated dormancy states). Thus, using these techniques, if the UE 115-a is indicated an SCell dormancy state (e.g., SCell behavior) other than the configured default dormancy state of the SCell, the indicated dormancy state may persist in the configured time duration (e.g., only in the configured time duration), unless there is another SCell dormancy state indicated within the time duration. At the end of the time duration, the UE 115-a may fall back to the configured default behavior. That is, the UE 115-a may determine that the SCell is in the default dormancy state when the time duration expires.

In some cases, a timer at the UE 115-a may be configured with the time duration described above, and the UE 115-a may determine that the SCell is in an indicated dormancy state for the duration of the timer. In such cases, once a dormancy state of an SCell (e.g., SCell behavior) other than the default dormancy state (e.g., default behavior) is indicated to the UE 115-a, the UE 115-a may start or restart the timer. Then, at the expiration of the timer, the UE 115-a may determine that the SCell is in the default dormancy state (e.g., SCell dormancy state may fall back to the default dormancy state). In some examples, an infinite timer may be configured, which may imply that the UE 115-a is to stick to a previously indicated dormancy state of an SCell until another indication of another dormancy state is received (e.g., until further notice).

In other cases, the time duration described above may be a number of on-durations of a DRX cycle (e.g., one or more) for which the UE 115-a is to determine that the SCell is in an indicated dormancy state (e.g., the time duration may be synchronized with a DRX cycle). In such cases, the UE 115-a may keep a count of a number of on-durations after receiving the dormancy indication 210. Then, after the count reaches the number of on-durations of the DRX cycle corresponding to the time duration, the UE 115-a may determine that the SCell is in the default dormancy state at the end of a last on-duration (e.g., SCell dormancy state may fall back to the default dormancy state). That is, once the UE enters the off-duration after a last on-duration that brings the count to the number of on-durations of the DRX cycle corresponding to the time duration, the UE 115-a may determine that the SCell is in the default dormancy state (e.g., all SCells or all groups of SCells may switch to the configured default dormancy state). In one example, the UE 115-a may increment the count at the start or end of each on-duration. In some cases, the UE 115-a may enter the off-duration or DRX inactive time after the expiration of a DRX inactivity timer.

Figure 3:
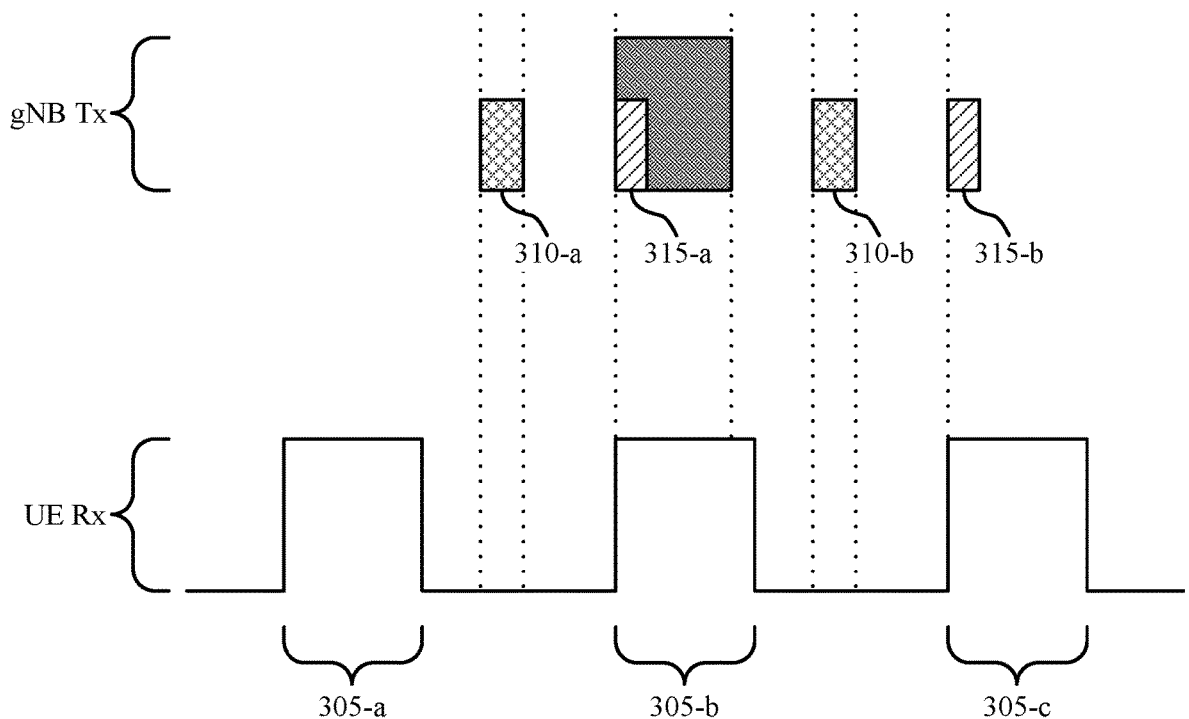
FIG. 3 illustrates an example of communications between a base station and a user equipment (UE) when the UE is operating in a discontinuous reception (DRX) mode in accordance with aspects of the present disclosure.

FIG. 3 illustrates an example of communications 300 between a base station 105 and a UE 115 when the UE 115 is operating in a DRX mode in accordance with aspects of the present disclosure. In the example of FIG. 3, the UE 115 may fail to receive a dormancy indication for an SCell prior to or during the on-duration 305-a. Thus, the UE 115 may determine that the SCell is in a default dormancy state, and the UE 115 may communicate with the base station 105 based on the default dormancy state of the SCell. The UE 115 may then receive a WUS 310-a including a dormancy indication indicating a dormancy state of the SCell prior to a second on-duration 305-b, or the UE 115 may receive DCI in a PDCCH 315-a including a dormancy indication indicating a dormancy state of the SCell during the second on-duration 305-b. Accordingly, the UE 115 may determine that the SCell is in the indicated dormancy state for a time duration configured at the UE 115 (e.g., as described with reference to FIG. 2).

The UE 115 may then communicate with the base station 105 based on the indicated dormancy state of the SCell. For instance, the UE 115 may receive data in a PDSCH 320 from the base station 105 in the on-duration 305-b if the UE 115 determines that the SCell is active (e.g., if the indicated dormancy state of the SCell is active). The UE 115 may then receive a WUS 310-b without a dormancy indication for the SCell prior to a third on-duration 305-c, or the UE 115 may receive DCI in a PDCCH 315-b during the third on-duration 305-c without a dormancy indication for the SCell. Thus, if the configured time duration for the dormancy state indicated in the WUS 310-a or indicated in DCI in the PDCCH 315-a has not expired, the UE 115 may still determine that the SCell is in the indicated dormancy state. Alternatively, if the configured time duration for the dormancy state indicated in the WUS 310-a or indicated in DCI in the PDCCH 315-a has expired, the UE 115 may determine that the SCell is in the default dormancy state. Although the techniques described with reference to FIG. 3 are described in the context of a single, continuous DRX cycle at a UE 115, it is to be understood that each of the scenarios described for each on-duration 305 may be isolated and may be independently applicable.

Figure 4:
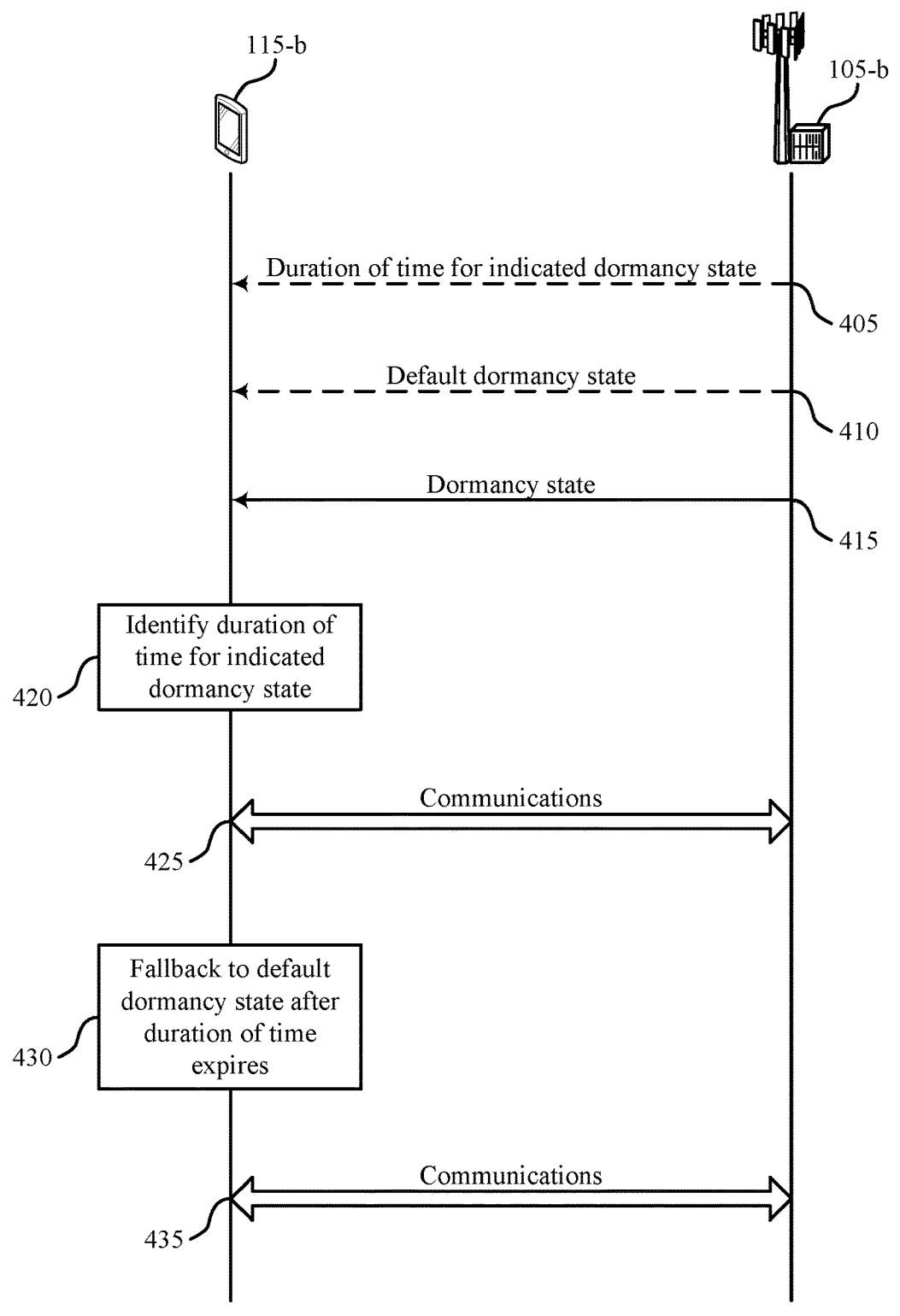
FIG. 4 illustrates an example of a process flow in accordance with aspects of the present disclosure.

FIG. 4 illustrates an example of a process flow 400 that supports configuration for SCell dormancy indications in accordance with aspects of the present disclosure. The process flow 400 illustrates aspects of techniques performed by a UE 115-b, which may be an example of a UE 115 described with reference to FIGS. 1-3. The process flow 400 also illustrates aspects of techniques performed by a base station 105-b, which may be an example of a base station 105 described with reference to FIGS. 1-3. As described herein, the UE 115-b in process flow 400 may support efficient techniques for identifying a dormancy state of an SCell (e.g., even when the UE 115-b has not received an indication of the dormancy state of the SCell).

At 405, the base station 105-b may transmit, and the UE 115-b may receive, signaling (e.g., RRC signaling) indicating the duration of time for which an SCell is to be in an indicated dormancy state. At 410, the base station 105-b may transmit, and the UE 115-b may receive, signaling (e.g., RRC signaling) indicating the default dormancy state of the SCell. The indication of the duration of time for which the SCell is to be in the indicated dormancy state, and the indication of the default dormancy state of the SCell may be signaled in a same message or in different messages. Further, in some examples, instead of the duration of time and the default dormancy state being signaled to the UE 115-b, the UE 115-b may be configured (e.g., preconfigured) with the duration of time and the default dormancy state for the SCell.

At 415, the base station 105-b may transmit, and the UE 115-b may receive, an indication of a dormancy state of the SCell. The dormancy state may indicate whether the SCell is dormant or active for communications between the UE 115-b and the base station 105-b. In some cases, the base station 105-b may transmit, and the UE 115-b may receive, the indication of the dormancy state of the SCell in wake-up signaling or in DCI in a PDCCH on a PCell or PSCell. At 420, the UE 115-b may identify the duration of time for which the SCell is to be in the indicated dormancy state (e.g., based on the signaling received at 405 or based on a configuration at the UE 115-b). At 425, the UE 115-b may then communicate with the base station 105-b based on the indicated dormancy state of the SCell. For instance, the UE 115-b may avoid attempting to communicate (e.g., transmit or receive signals) with the base station 105-b on the SCell if the SCell is dormant, or the UE 115-b may communicate with the base station 105-b on the SCell if the SCell is active.

In some cases, the indication of the dormancy state of the SCell received at 415 may be a first indication, and the indicated dormancy state may be a first dormancy state. In such cases, the UE 115-b may receive, from the base station 105-b, a second indication of a second dormancy state of the SCell, and the second indication may override the first indication. Thus, the UE 115-b may determine that the SCell is in the second dormancy state based on receiving the second indication. That is, the UE 115-b may determine that the SCell is in the indicated dormancy state until the UE 115-b receives another indication of another dormancy state of the SCell (e.g., until further notice), and the UE 115-b may continue communicating with the base station 105-b based on the indicated dormancy state of the SCell until the UE 115-b receives another indication of another dormancy state of the SCell.

In some cases, the UE 115-b may identify the default dormancy state of the SCell (e.g., based on the signaling received at 410 or based on a configuration at the UE 115-b), and the UE 115-b may determine that the SCell is in the default dormancy state after the duration of time has expired (e.g., where the default dormancy state is dormant or active). In one example, the duration of time may be configured for a timer, and the UE 115-b may start the timer upon receiving the indication of the dormancy state of the SCell at 415. Then, at 430, the UE 115-b may fall back to the default dormancy state of the SCell when the timer expires. In another example, the duration of time may be a number of on-durations of a DRX cycle, and the UE 115-b may start a counter for on-durations of the DRX cycle upon receiving the indication of the dormancy state of the SCell at 415. Then, at 430, the UE 115-b may fall back to the default dormancy state of the SCell at the end of a last on-duration after the counter reaches the number of on-durations of the DRX cycle. In yet another example, the duration of time may be a single, next on-duration of a DRX cycle, and the UE 115-b may fall back to the default dormancy state of the SCell at the end of the single, next on-duration. In this example, the UE 115-b may not receive signaling indicating the duration of time (e.g., at 405). Instead, the UE 115-b may be configured to determine that a cell dormancy indication (or indicated dormancy state) is valid for a next or first DRX active time (e.g., in the absence of any RRC configuration). At 435, the UE 115-b may communicate with the base station 105-b based on the default dormancy state of the SCell.

Figure 5:
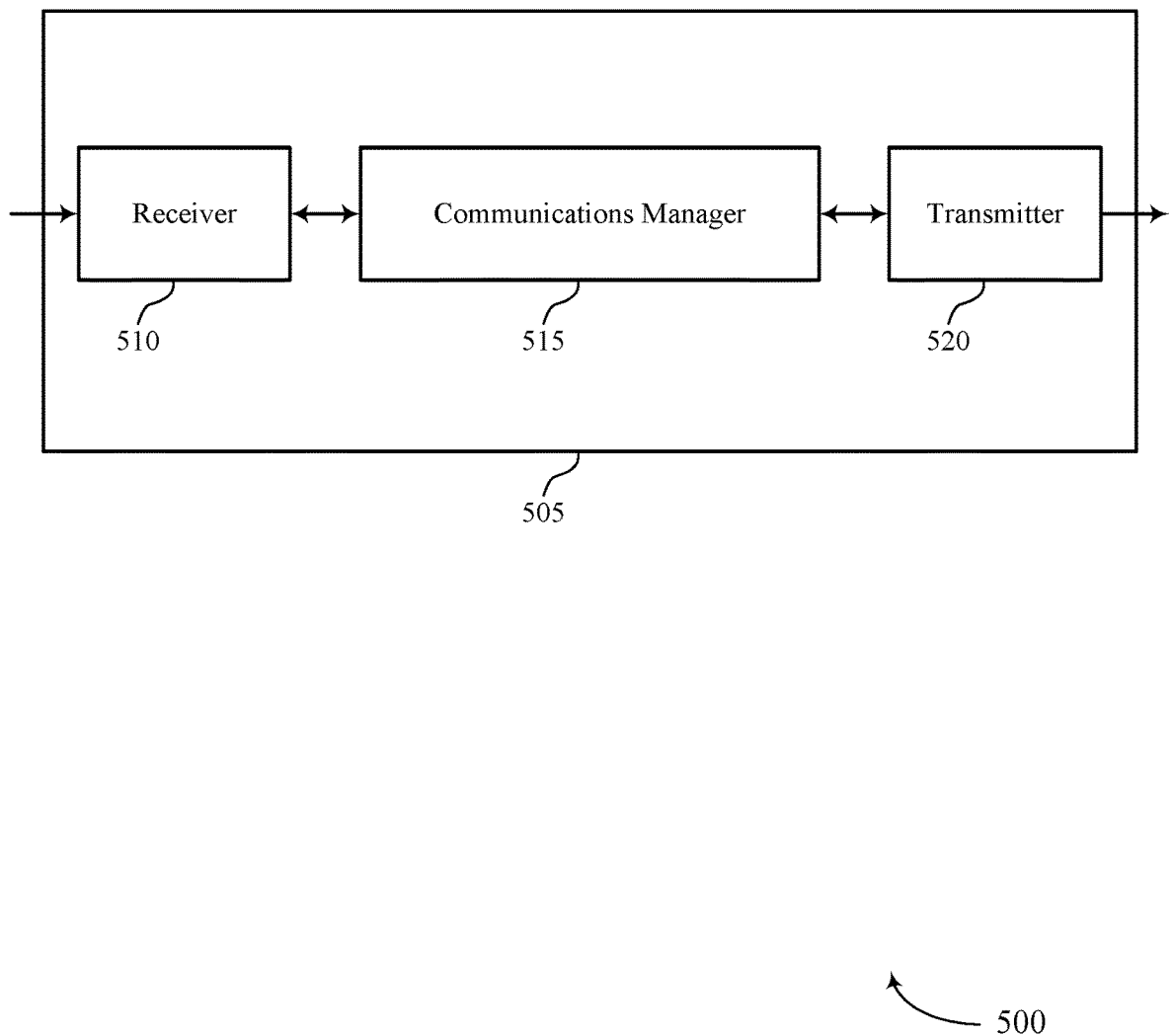
FIGS. 5 and 6 show block diagrams of devices in accordance with aspects of the present disclosure.

FIG. 5 shows a block diagram 500 of a device 505 that supports configuration for SCell dormancy indications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to configuration for SCell dormancy indications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may be implemented as an integrated circuit or chipset for the device 505, and the receiver 510 and the transmitter 520 may be implemented as analog components (for example, amplifiers, filters, antennas) coupled with the device 505 modem to enable wireless transmission and reception. The communications manager 515 may be an example of aspects of the communications manager 810 described herein. The actions performed by the communications manager 515 as described herein may be implemented to realize one or more potential advantages. At least one implementation may enable the communications manager 515 to support activating and deactivating secondary cells to adapt to traffic patterns to maximize throughput and save power.

For example, the communications manager 515 may receive, from a base station, an indication of a dormancy state of a secondary cell, the dormancy state indicating whether the secondary cell is dormant or active for communications between the UE and the base station, identify a duration of time for which the secondary cell is to be in the indicated dormancy state, and communicate with the base station based on the indicated dormancy state of the secondary cell. By communicating with the base station based on the indicated dormancy state of the secondary cell for at least the duration of time and falling back to a default dormancy state after the duration of time expires, one or more processors of the device 505 (e.g., processor(s) controlling or incorporated with the communications manager 515) may experience power savings (e.g., increased battery life) while improving throughput since the UE may communicate on the secondary cell when the secondary cell is active and avoid attempting to communicate on the secondary cell when the secondary cell is dormant.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
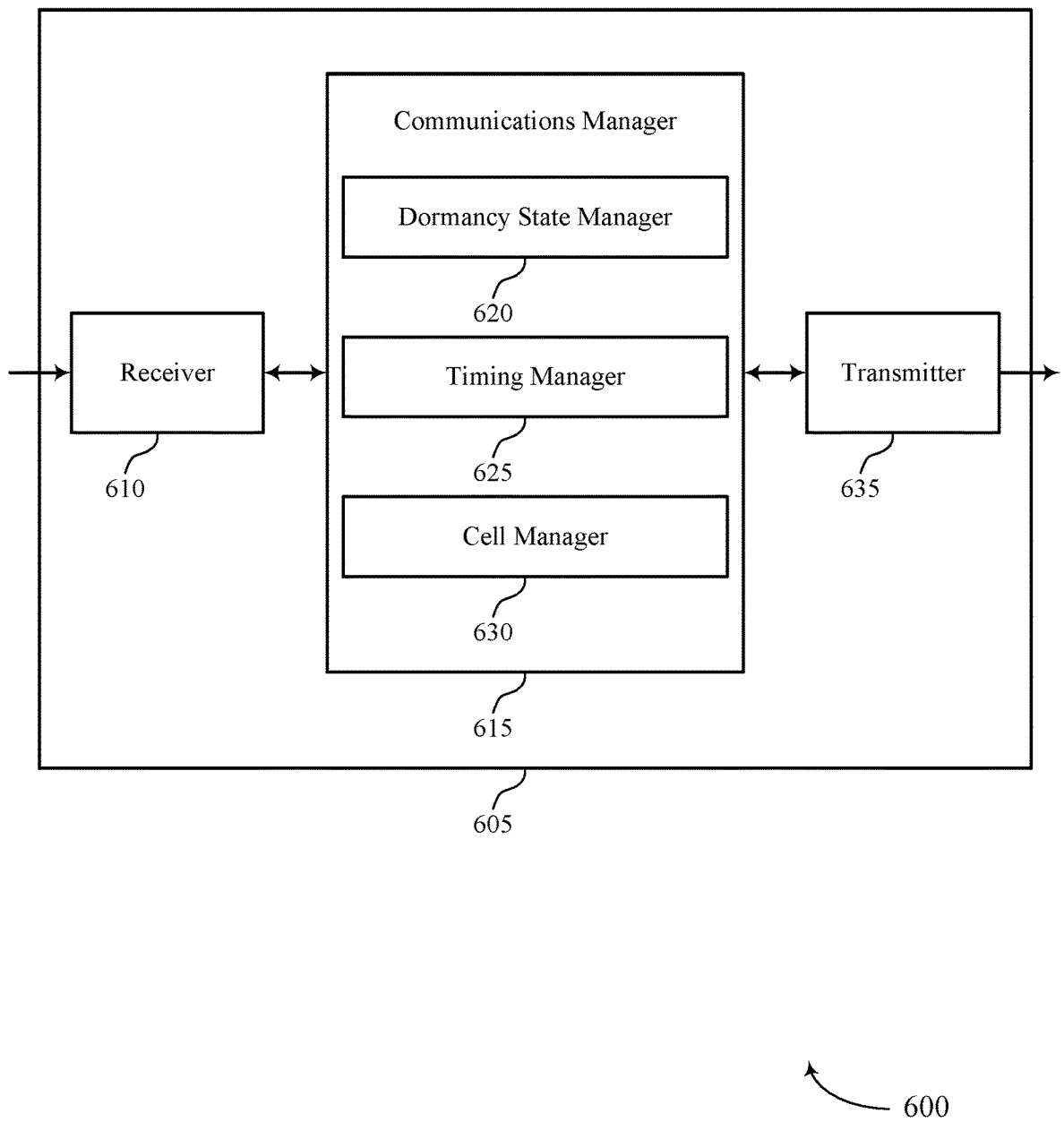

FIG. 6 shows a block diagram 600 of a device 605 that supports configuration for SCell dormancy indications in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to configuration for SCell dormancy indications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a dormancy state manager 620, a timing manager 625, and a cell manager 630. The communications manager 615 may be an example of aspects of the communications manager 810 described herein.

The dormancy state manager 620 may receive, from a base station, an indication of a dormancy state of a secondary cell, the dormancy state indicating whether the secondary cell is dormant or active for communications between the UE and the base station. The timing manager 625 may identify a duration of time for which the secondary cell is to be in the indicated dormancy state. The cell manager 630 may communicate with the base station based on the indicated dormancy state of the secondary cell.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
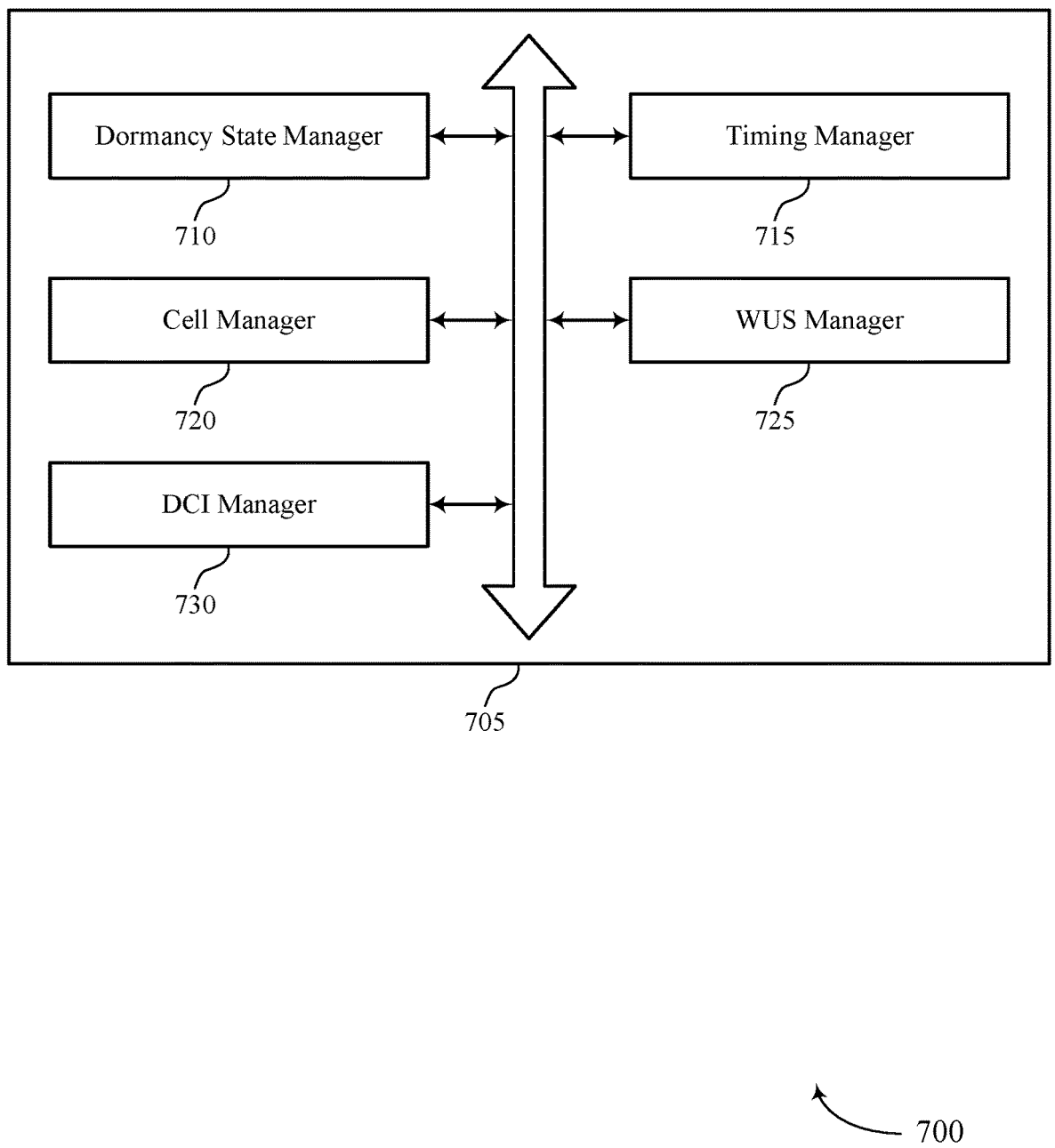
FIG. 7 shows a block diagram of a communications manager in accordance with aspects of the present disclosure.

FIG. 7 shows a block diagram 700 of a communications manager 705 that supports configuration for SCell dormancy indications in accordance with aspects of the present disclosure. The communications manager 705 may be an example of aspects of a communications manager 515, a communications manager 615, or a communications manager 810 described herein. The communications manager 705 may include a dormancy state manager 710, a timing manager 715, a cell manager 720, a WUS manager 725, and a DCI manager 730. Each of these modules may communicate, directly or indirectly, with one another (e.g., via one or more buses).

The dormancy state manager 710 may receive, from a base station, an indication of a dormancy state of a secondary cell, the dormancy state indicating whether the secondary cell is dormant or active for communications between the UE and the base station. The timing manager 715 may identify a duration of time for which the secondary cell is to be in the indicated dormancy state. The cell manager 720 may communicate with the base station based on the indicated dormancy state of the secondary cell.

In some examples, the timing manager 715 may receive, from the base station, signaling indicating the duration of time for which the secondary cell is to be in the indicated dormancy state. In some examples, the dormancy state manager 710 may identify a default dormancy state of the secondary cell. In some examples, the dormancy state manager 710 may determine that the secondary cell is in the default dormancy state after the duration of time has expired, where the default dormancy state is dormant or active. In some examples, the dormancy state manager 710 may receive, from the base station, signaling indicating the default dormancy state of the secondary cell. The WUS manager 725 may receive wake-up signaling indicating the dormancy state of the secondary cell. The DCI manager 730 may receive downlink control information on a primary cell or a primary secondary cell indicating the dormancy state of the secondary cell.

In some examples, the timing manager 715 may start the timer upon receiving the indication of the dormancy state of the secondary cell. In some examples, the dormancy state manager 710 may fall back to a default dormancy state of the secondary cell when the timer expires. In some examples, the timing manager 715 may start a counter for on-durations of the discontinuous reception cycle upon receiving the indication of the dormancy state of the secondary cell. In some examples, the dormancy state manager 710 may fall back to a default dormancy state of the secondary cell at an end of a last on-duration after the counter reaches the number of on-durations of the discontinuous reception cycle. In some examples, the dormancy state manager 710 may fall back to the default dormancy state of the secondary cell at an end of the single, next on-duration of the discontinuous reception cycle.

In some examples, the dormancy state manager 710 may determine that the secondary cell is in the indicated dormancy state until the UE receives another indication of another dormancy state of the secondary cell. In some examples, the dormancy state manager 710 may receive a second indication of a second dormancy state of the secondary cell, where the second indication overrides the first indication. In some examples, the dormancy state manager 710 may determine that the secondary cell is in the second dormancy state based on receiving the second indication. In some examples, the dormancy state manager 710 may determine that the secondary cell is dormant for communications between the UE and the base station for at least the identified duration of time. In some examples, the dormancy state manager 710 may determine that the secondary cell is active for communications between the UE and the base station for at least the identified duration of time.

Figure 8:
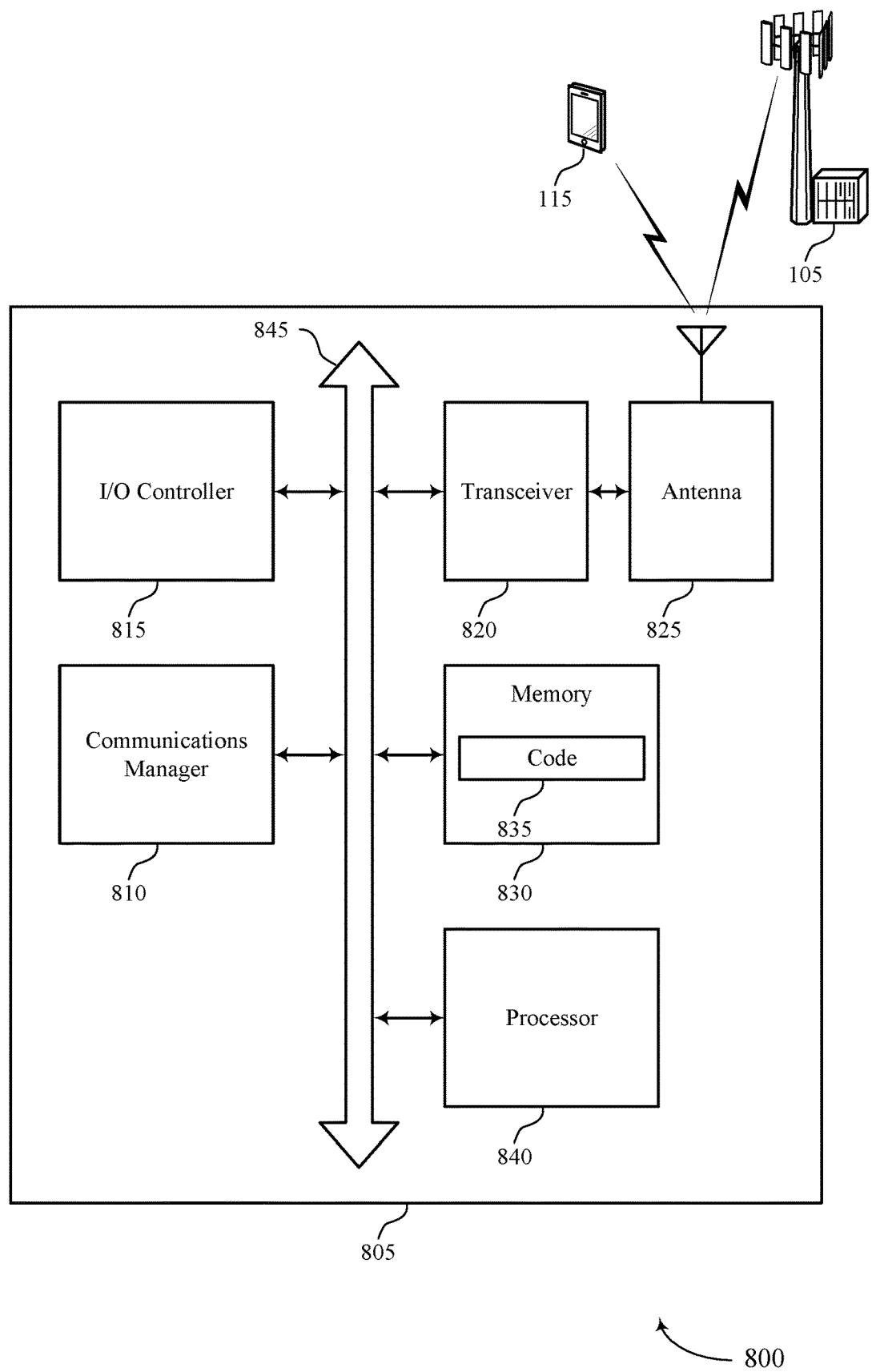
FIG. 8 shows a diagram of a system including a device in accordance with aspects of the present disclosure.

FIG. 8 shows a diagram of a system 800 including a device 805 that supports configuration for SCell dormancy indications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, an indication of a dormancy state of a secondary cell, the dormancy state indicating whether the secondary cell is dormant or active for communications between the UE and the base station, identify a duration of time for which the secondary cell is to be in the indicated dormancy state, and communicate with the base station based on the indicated dormancy state of the secondary cell.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting configuration for SCell dormancy indications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
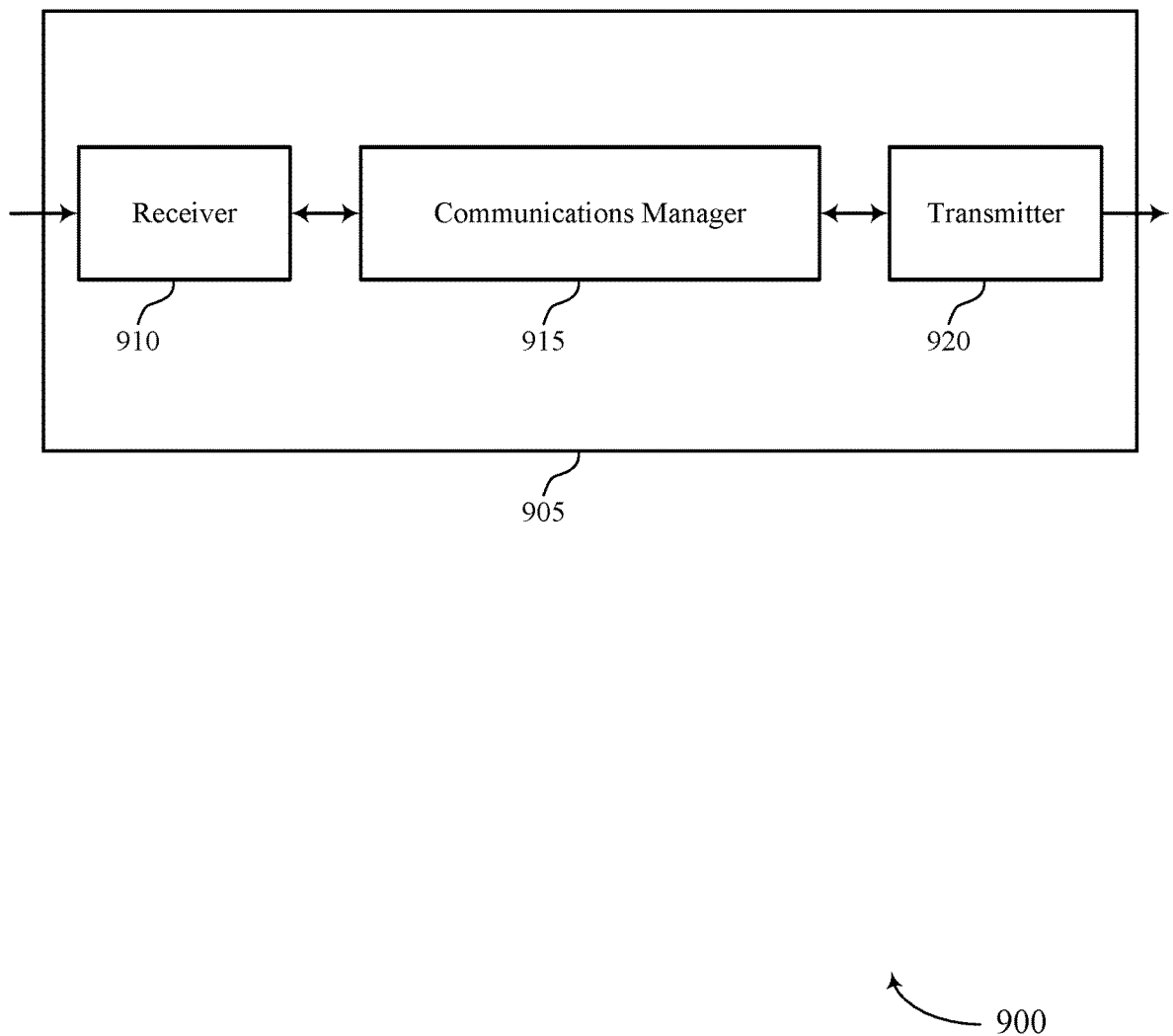
FIGS. 9 and 10 show block diagrams of devices in accordance with aspects of the present disclosure.

FIG. 9 shows a block diagram 900 of a device 905 that supports configuration for SCell dormancy indications in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to configuration for SCell dormancy indications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, signaling indicating a duration of time for which a secondary cell is to be in a dormancy state, determine the dormancy state of the secondary cell, the dormancy state indicating whether the secondary cell is dormant or active for communications between the UE and the base station, transmit, to the UE, an indication of the dormancy state of the secondary cell based on the determining, and communicate with the UE based on the indicated dormancy state of the secondary cell. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
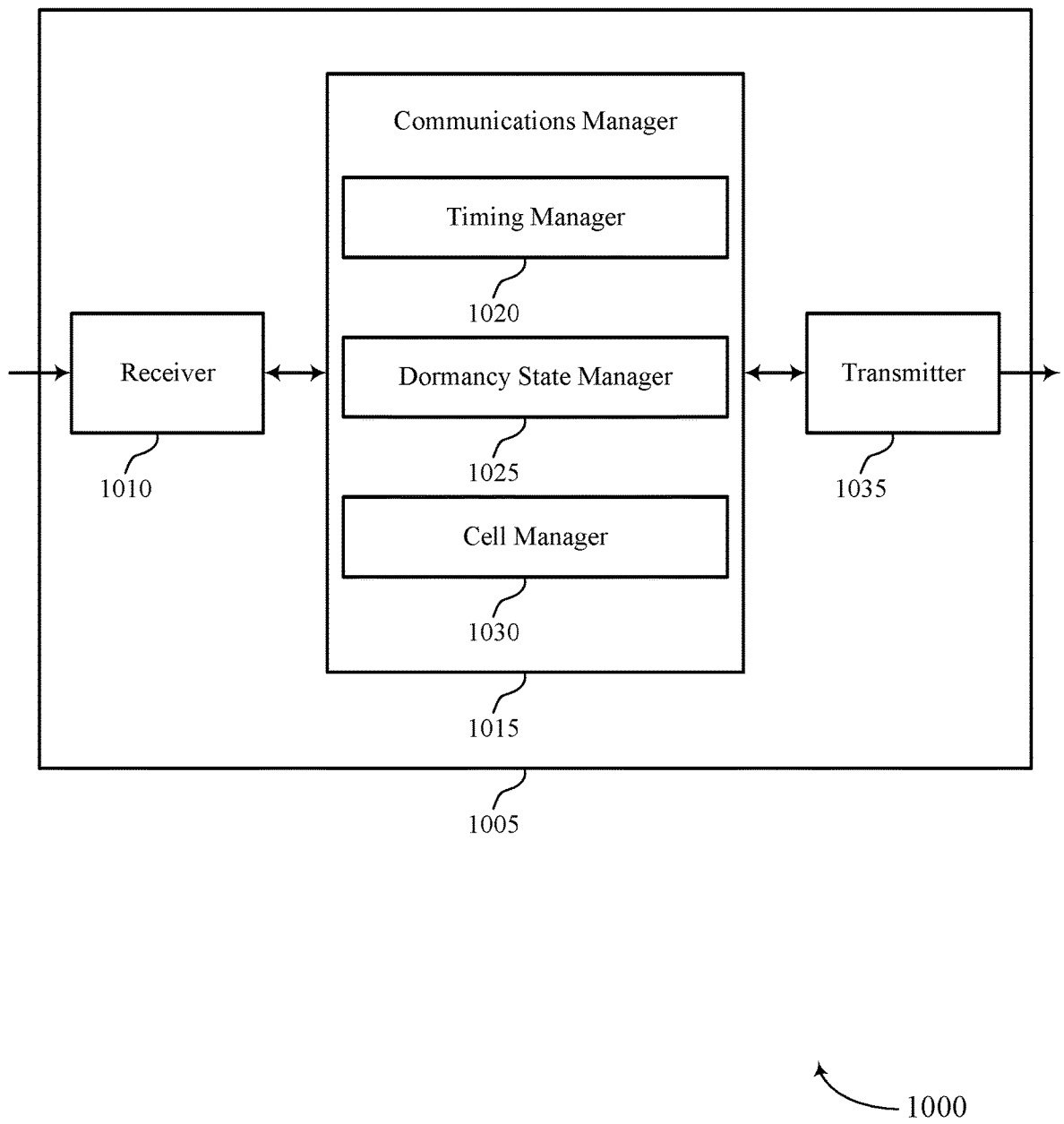

FIG. 10 shows a block diagram 1000 of a device 1005 that supports configuration for SCell dormancy indications in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to configuration for SCell dormancy indications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a timing manager 1020, a dormancy state manager 1025, and a cell manager 1030. The communications manager 1015 may be an example of aspects of the communications manager 1210 described herein.

The timing manager 1020 may transmit, to a UE, signaling indicating a duration of time for which a secondary cell is to be in a dormancy state. The dormancy state manager 1025 may determine the dormancy state of the secondary cell, the dormancy state indicating whether the secondary cell is dormant or active for communications between the UE and the base station and transmit, to the UE, an indication of the dormancy state of the secondary cell based on the determining. The cell manager 1030 may communicate with the UE based on the indicated dormancy state of the secondary cell.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
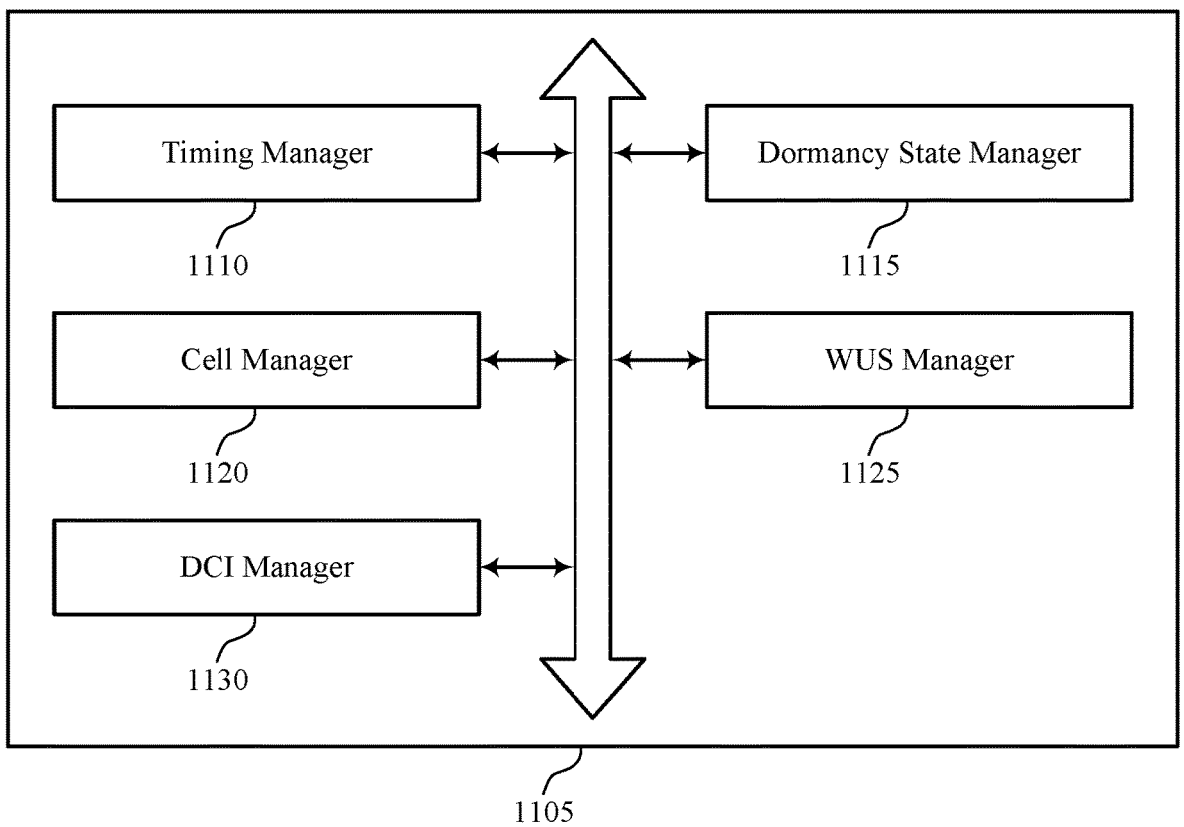
FIG. 11 shows a block diagram of a communications manager in accordance with aspects of the present disclosure.

FIG. 11 shows a block diagram 1100 of a communications manager 1105 that supports configuration for SCell dormancy indications in accordance with aspects of the present disclosure. The communications manager 1105 may be an example of aspects of a communications manager 915, a communications manager 1015, or a communications manager 1210 described herein. The communications manager 1105 may include a timing manager 1110, a dormancy state manager 1115, a cell manager 1120, a WUS manager 1125, and a DCI manager 1130. Each of these modules may communicate, directly or indirectly, with one another (e.g., via one or more buses).

The timing manager 1110 may transmit, to a UE, signaling indicating a duration of time for which a secondary cell is to be in a dormancy state. The dormancy state manager 1115 may determine the dormancy state of the secondary cell, the dormancy state indicating whether the secondary cell is dormant or active for communications between the UE and the base station. In some examples, the dormancy state manager 1115 may transmit, to the UE, an indication of the dormancy state of the secondary cell based on the determining. The cell manager 1120 may communicate with the UE based on the indicated dormancy state of the secondary cell.

In some examples, the dormancy state manager 1115 may transmit, to the UE, signaling indicating a default dormancy state of the secondary cell, where the default dormancy state is dormant or active. The WUS manager 1125 may transmit wake-up signaling indicating the dormancy state of the secondary cell. The DCI manager 1130 may transmit downlink control information on a primary cell or a primary secondary cell indicating the dormancy state of the secondary cell. In some cases, the duration of time for which the secondary cell is to be in the indicated dormancy state is configured for a timer. In some cases, the duration of time for which the secondary cell is to be in the indicated dormancy state is a number of on-durations of a discontinuous reception cycle at the UE. In some cases, the duration of time for which the secondary cell is to be in the indicated dormancy state is a single, next on-duration of a discontinuous reception cycle at the UE. In some cases, the duration of time for which the secondary cell is to be in an indicated dormancy state is until further notice. In some examples, the dormancy state manager 1115 may transmit a second indication of a second dormancy state of the secondary cell, where the second indication overrides the first indication. In some cases, the indicated dormancy state is dormant or active.

Figure 12:
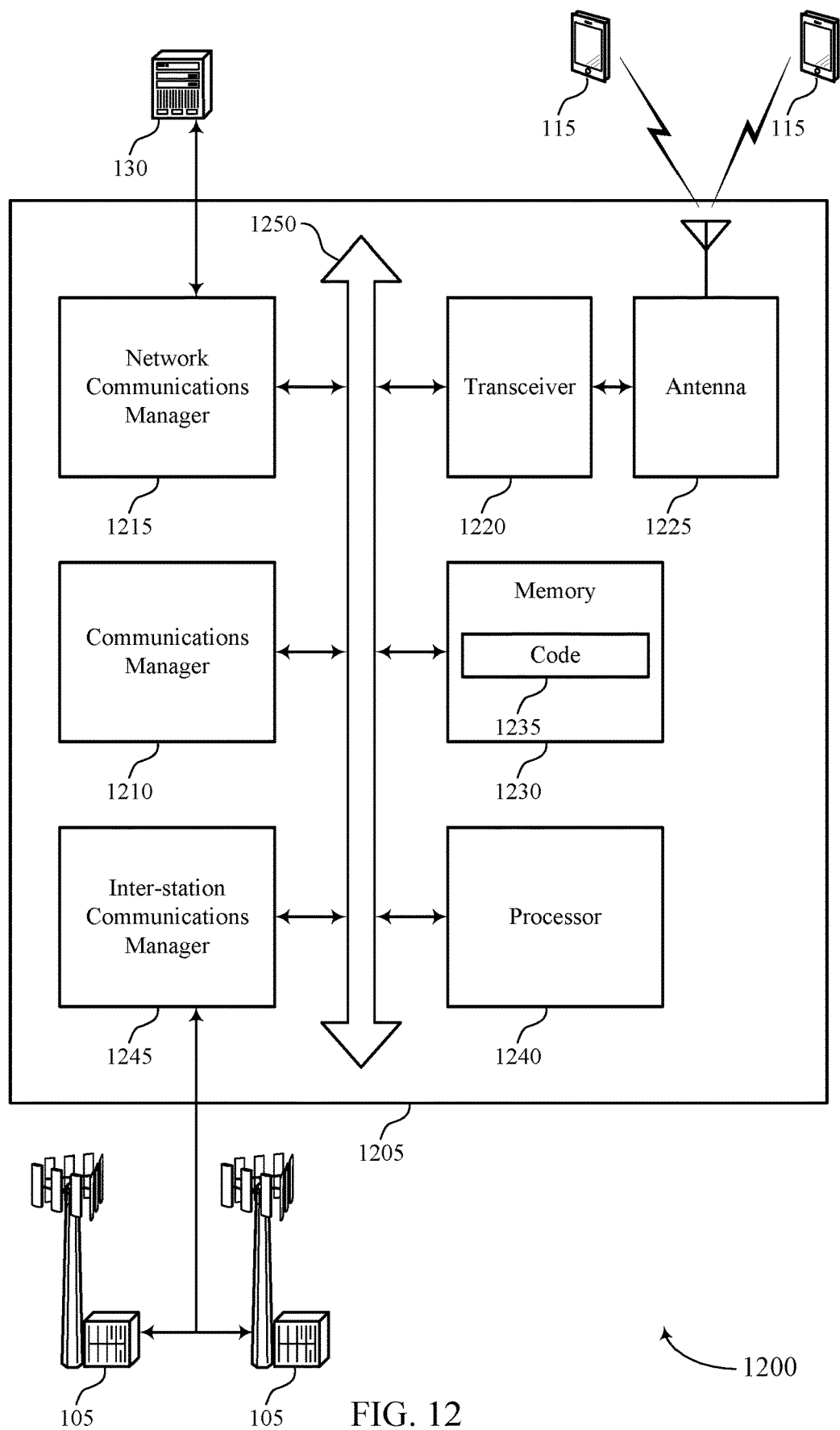
FIG. 12 shows a diagram of a system including a device in accordance with aspects of the present disclosure.

FIG. 12 shows a diagram of a system 1200 including a device 1205 that supports configuration for SCell dormancy indications in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, signaling indicating a duration of time for which a secondary cell is to be in an indicated dormancy state, determine the dormancy state of the secondary cell, the dormancy state indicating whether the secondary cell is dormant or active for communications between the UE and the base station, transmit, to the UE, an indication of the dormancy state of the secondary cell based on the determining, and communicate with the UE based on the indicated dormancy state of the secondary cell.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting configuration for SCell dormancy indications).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
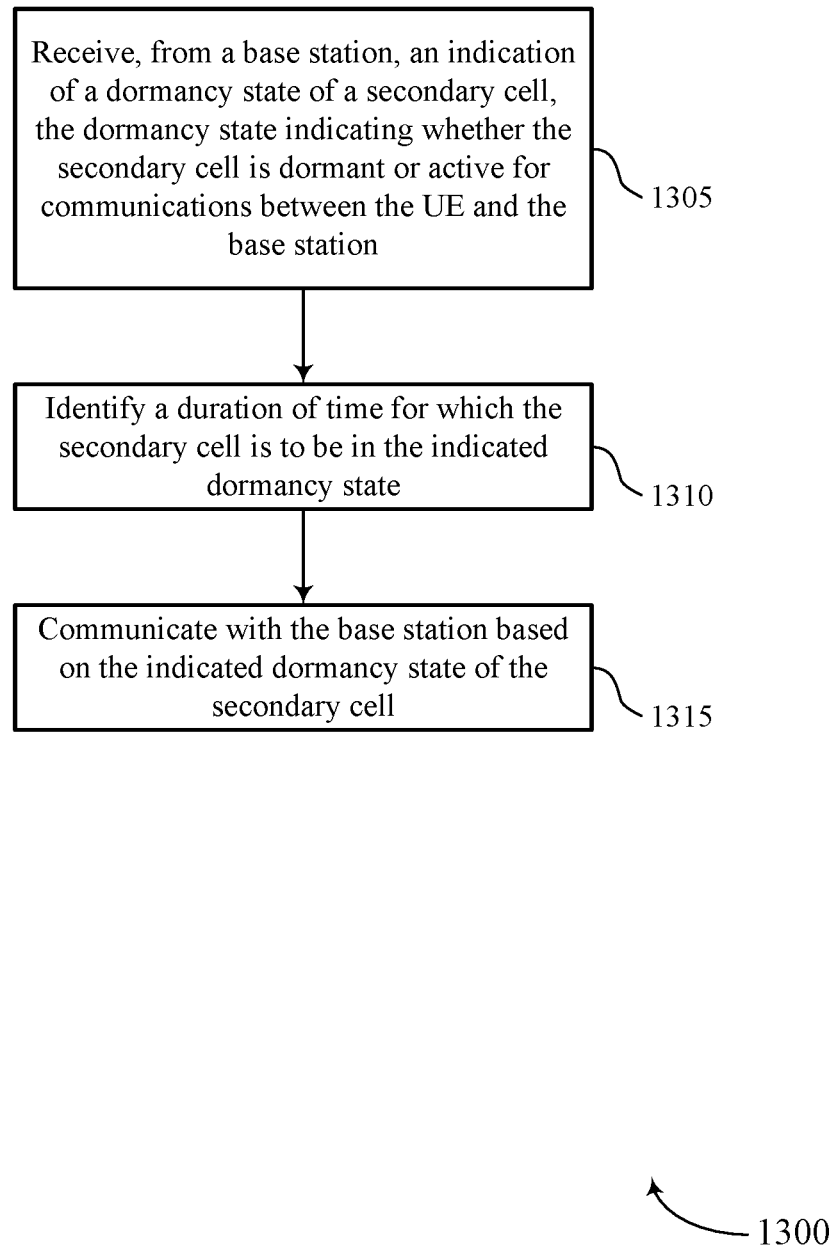
FIGS. 13 and 14 show flowcharts illustrating methods in accordance with aspects of the present disclosure.

FIG. 13 shows a flowchart illustrating a method 1300 that supports configuration for SCell dormancy indications in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may receive, from a base station, an indication of a dormancy state of a secondary cell, the dormancy state indicating whether the secondary cell is dormant or active for communications between the UE and the base station. The operations of 1305 may be performed according to the methods described herein. In some examples, aspects of the operations of 1305 may be performed by a dormancy state manager as described with reference to FIGS. 5 through 8.

At 1310, the UE may identify a duration of time for which the secondary cell is to be in the indicated dormancy state. The operations of 1310 may be performed according to the methods described herein. In some examples, aspects of the operations of 1310 may be performed by a timing manager as described with reference to FIGS. 5 through 8.

At 1315, the UE may communicate with the base station based on the indicated dormancy state of the secondary cell. The operations of 1315 may be performed according to the methods described herein. In some examples, aspects of the operations of 1315 may be performed by a cell manager as described with reference to FIGS. 5 through 8.

Figure 14:
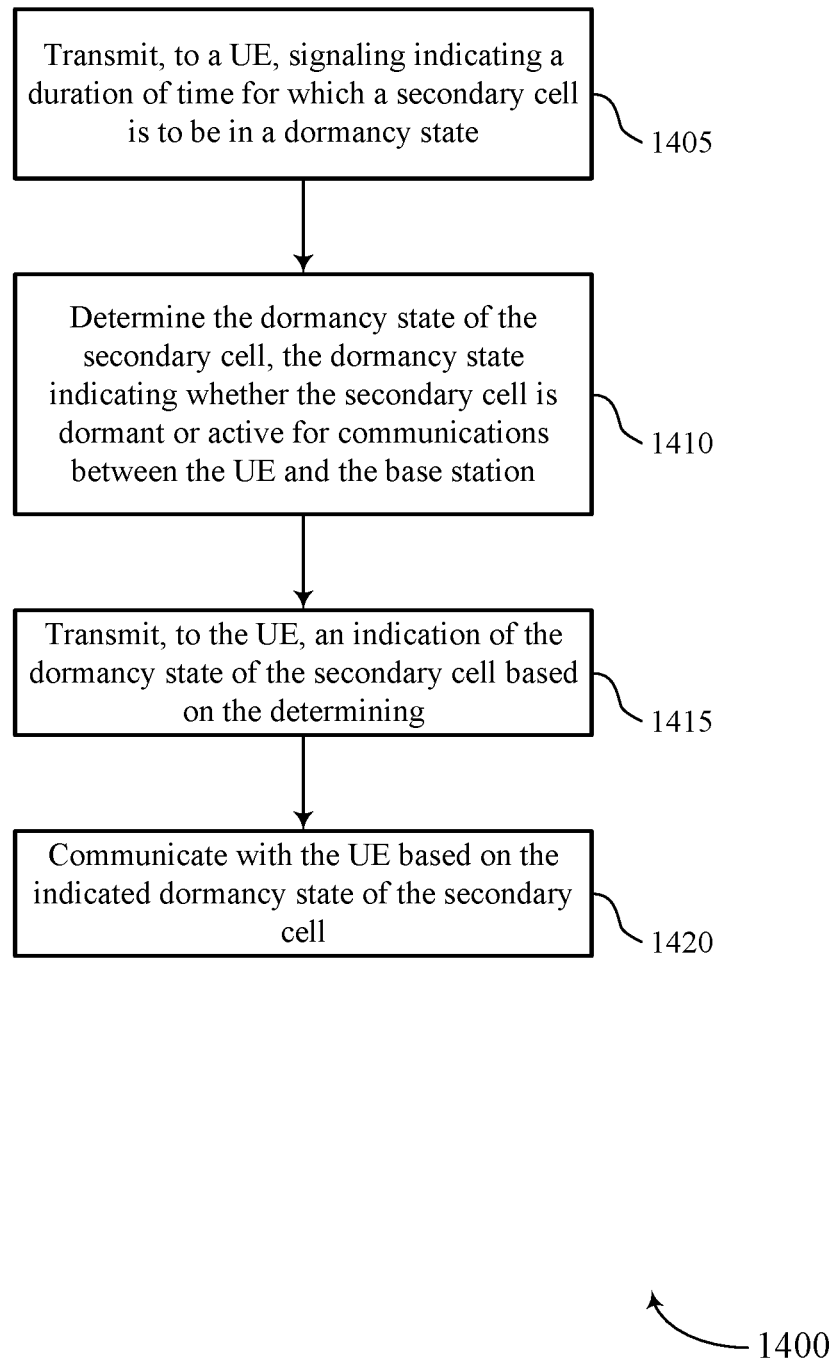

FIG. 14 shows a flowchart illustrating a method 1400 that supports configuration for SCell dormancy indications in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1405, the base station may transmit, to a UE, signaling indicating a duration of time for which a secondary cell is to be in a dormancy state. The operations of 1405 may be performed according to the methods described herein. In some examples, aspects of the operations of 1405 may be performed by a timing manager as described with reference to FIGS. 9 through 12.

At 1410, the base station may determine the dormancy state of the secondary cell, the dormancy state indicating whether the secondary cell is dormant or active for communications between the UE and the base station. The operations of 1410 may be performed according to the methods described herein. In some examples, aspects of the operations of 1410 may be performed by a dormancy state manager as described with reference to FIGS. 9 through 12.

At 1415, the base station may transmit, to the UE, an indication of the dormancy state of the secondary cell based on the determining. The operations of 1415 may be performed according to the methods described herein. In some examples, aspects of the operations of 1415 may be performed by a dormancy state manager as described with reference to FIGS. 9 through 12.

At 1420, the base station may communicate with the UE based on the indicated dormancy state of the secondary cell. The operations of 1420 may be performed according to the methods described herein. In some examples, aspects of the operations of 1420 may be performed by a cell manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, an indication of a dormancy state of a secondary cell, the dormancy state indicating whether the secondary cell is dormant or active for communications between the UE and the base station; identifying a duration of time for which the secondary cell is to be in the indicated dormancy state; and communicating with the base station based at least in part on the indicated dormancy state of the secondary cell.

Aspect 2: The method of aspect 1, further comprising: receiving, from the base station, signaling indicating the duration of time for which the secondary cell is to be in the indicated dormancy state.

Aspect 3: The method of any of aspects 1 through 2, further comprising: identifying a default dormancy state of the secondary cell; and determining that the secondary cell is in the default dormancy state after the duration of time has expired, wherein the default dormancy state is dormant or active.

Aspect 4: The method of aspect 3, further comprising: receiving, from the base station, signaling indicating the default dormancy state of the secondary cell.

Aspect 5: The method of any of aspects 1 through 4, wherein receiving the indication of the dormancy state of the secondary cell comprises: receiving wake-up signaling indicating the dormancy state of the secondary cell.

Aspect 6: The method of any of aspects 1 through 5, wherein receiving the indication of the dormancy state of the secondary cell comprises: receiving downlink control information on a primary cell or a primary secondary cell indicating the dormancy state of the secondary cell.

Aspect 7: The method of any of aspects 1 through 6, wherein the duration of time for which the secondary cell is to be in the indicated dormancy state is configured for a timer, the method further comprising: starting the timer upon receiving the indication of the dormancy state of the secondary cell; and falling back to a default dormancy state of the secondary cell when the timer expires.

Aspect 8: The method of any of aspects 1 through 7, wherein the duration of time for which the secondary cell is to be in the indicated dormancy state is a number of on-durations of a discontinuous reception cycle, the method further comprising: starting a counter for on-durations of the discontinuous reception cycle upon receiving the indication of the dormancy state of the secondary cell; and falling back to a default dormancy state of the secondary cell at an end of a last on-duration after the counter reaches the number of on-durations of the discontinuous reception cycle.

Aspect 9: The method of any of aspects 1 through 8, wherein the duration of time for which the secondary cell is to be in the indicated dormancy state is a single, next on-duration of a discontinuous reception cycle, the method further comprising: falling back to the default dormancy state of the secondary cell at an end of the single, next on-duration of the discontinuous reception cycle.

Aspect 10: The method of any of aspects 1 through 9, further comprising: determining that the secondary cell is in the indicated dormancy state until the UE receives another indication of another dormancy state of the secondary cell.

Aspect 11: The method of any of aspects 1 through 10, wherein the indication of the dormancy state of the secondary cell comprises a first indication, and the indicated dormancy state comprises a first dormancy state, the method further comprising: receiving a second indication of a second dormancy state of the secondary cell, wherein the second indication overrides the first indication; and determining that the secondary cell is in the second dormancy state based at least in part on receiving the second indication.

Aspect 12: The method of any of aspects 1 through 11, wherein the indicated dormancy state is dormant, the method further comprising: determining that the secondary cell is dormant for communications between the UE and the base station for at least the identified duration of time.

Aspect 13: The method of any of aspects 1 through 12, wherein the indicated dormancy state is active, the method further comprising: determining that the secondary cell is active for communications between the UE and the base station for at least the identified duration of time.

Aspect 14: A method for wireless communication at a base station, comprising: transmitting, to a UE, signaling indicating a duration of time for which a secondary cell is to be in a dormancy state; determining the dormancy state of the secondary cell, the dormancy state indicating whether the secondary cell is dormant or active for communications between the UE and the base station; transmitting, to the UE, an indication of the dormancy state of the secondary cell based at least in part on the determining; and communicating with the UE based at least in part on the indicated dormancy state of the secondary cell.

Aspect 15: The method of aspect 14, further comprising: transmitting, to the UE, signaling indicating a default dormancy state of the secondary cell, wherein the default dormancy state is dormant or active.

Aspect 16: The method of any of aspects 14 through 15, wherein transmitting the indication of the dormancy state of the secondary cell comprises: transmitting wake-up signaling indicating the dormancy state of the secondary cell.

Aspect 17: The method of any of aspects 14 through 16, wherein transmitting the indication of the dormancy state of the secondary cell comprises: transmitting downlink control information on a primary cell or a primary secondary cell indicating the dormancy state of the secondary cell.

Aspect 18: The method of any of aspects 14 through 17, wherein the duration of time for which the secondary cell is to be in the indicated dormancy state is configured for a timer.

Aspect 19: The method of any of aspects 14 through 18, wherein the duration of time for which the secondary cell is to be in the indicated dormancy state is a number of on-durations of a discontinuous reception cycle at the UE.

Aspect 20: The method of any of aspects 14 through 19, wherein the duration of time for which the secondary cell is to be in the indicated dormancy state is a single, next on-duration of a discontinuous reception cycle at the UE.

Aspect 21: The method of any of aspects 14 through 20, wherein the duration of time for which the secondary cell is to be in an indicated dormancy state is until further notice.

Aspect 22: The method of any of aspects 14 through 21, wherein the indication of the dormancy state of the secondary cell comprises a first indication, and the indicated dormancy state comprises a first dormancy state, the method further comprising: transmitting a second indication of a second dormancy state of the secondary cell, wherein the second indication overrides the first indication.

Aspect 23: The method of any of aspects 14 through 22, wherein the indicated dormancy state is dormant or active.

Aspect 24: An apparatus for wireless communication at a UE, comprising a processor; memory coupled with the processor; and instructions stored in the memory and executable by the processor to cause the apparatus to perform a method of any of aspects 1 through 13.

Aspect 25: An apparatus for wireless communication at a UE, comprising at least one means for performing a method of any of aspects 1 through 13.

Aspect 26: A non-transitory computer-readable medium storing code for wireless communication at a UE, the code comprising instructions executable by a processor to perform a method of any of aspects 1 through 13.

Aspect 27: An apparatus for wireless communication at a base station, comprising a processor; memory coupled with the processor; and instructions stored in the memory and executable by the processor to cause the apparatus to perform a method of any of aspects 14 through 23.

Aspect 28: An apparatus for wireless communication at a base station, comprising at least one means for performing a method of any of aspects 14 through 23.

Aspect 29: A non-transitory computer-readable medium storing code for wireless communication at a base station, the code comprising instructions executable by a processor to perform a method of any of aspects 14 through 23.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a network device and prior to receiving an indication of a dormancy state of a first secondary cell of a plurality of secondary cells, first signaling indicating a secondary cell dormancy configuration that indicates:
      a duration of time for which each of the plurality of secondary cells is to be in a later indicated dormancy state, and a default state of each of the plurality of secondary cells, wherein the default state is dormant or active and corresponds to a default behavior a respective secondary cell is to fall back to after the duration of time associated with the respective secondary cell has expired;

receiving, from the network device, second signaling indicating the dormancy state of the first secondary cell, the dormancy state indicating whether the first secondary cell is currently dormant or active for communications between the UE and the network device, wherein, based at least in part on a discontinuous reception cycle of the UE, the second signaling indicating the dormancy state of the first secondary cell is received in one of a wake-up signal or downlink control information on a primary cell or a primary secondary cell;

communicating, for a first duration of time indicated by the secondary cell dormancy configuration for the first secondary cell, with the network device based at least in part on the indicated dormancy state of the first secondary cell;

starting a timer for the first secondary cell based at least in part on receiving the second signaling indicating the dormancy state of the first secondary cell, wherein the first duration of time for which the first secondary cell is to be in the indicated dormancy state is configured for the timer; and falling back to a first default state indicated by the secondary cell dormancy configuration for the first secondary cell when the timer for the first secondary cell expires.

2. The method of claim 1, further comprising:
determining that the first secondary cell is in the first default state indicated by the secondary cell dormancy configuration for the first secondary cell after the first duration of time has expired.

3. The method of claim 1, wherein the first signaling indicating the secondary cell dormancy configuration is radio resource control signaling.

4. The method of claim 1, wherein receiving the second signaling indicating the dormancy state of the first secondary cell comprises:
receiving, based at least in part on the UE being outside of a discontinuous reception active time, the wake-up signal in a physical downlink control channel; and
transitioning to a wake state for a next on-duration in the discontinuous reception cycle based at least in part on the wake-up signal.

5. The method of claim 1, wherein receiving the second signaling indicating the dormancy state of the first secondary cell comprises:
receiving, based at least in part on the UE being within a discontinuous reception active time, the downlink control information on the primary cell or the primary secondary cell.

6. The method of claim 1, wherein the first duration of time for which the first secondary cell is to be in the indicated dormancy state is a number of on-durations of the discontinuous reception cycle, the method further comprising:
starting a counter for on-durations of the discontinuous reception cycle based at least in part on receiving the indication of the dormancy state of the first secondary cell; and
falling back to the first default state indicated by the secondary cell dormancy configuration for the first secondary cell at an end of a last on-duration after the counter reaches the number of on-durations of the discontinuous reception cycle.

7. The method of claim 1, wherein the first duration of time for which the first secondary cell is to be in the indicated dormancy state is a single, next on-duration of the discontinuous reception cycle, the method further comprising:
falling back to the first default state indicated by the secondary cell dormancy configuration for the first secondary cell at an end of the single, next on-duration of the discontinuous reception cycle.

8. The method of claim 1, further comprising:
determining that the first secondary cell is in the indicated dormancy state until the UE receives an indication of another dormancy state of the first secondary cell.

9. The method of claim 1, wherein the indication of the dormancy state of the first secondary cell comprises a first indication, and the indicated dormancy state comprises a first dormancy state, the method further comprising:
receiving a second indication of a second dormancy state of the first secondary cell, wherein the second indication overrides the first indication; and
determining that the first secondary cell is in the second dormancy state based at least in part on receiving the second indication.

10. The method of claim 1, wherein the indicated dormancy state is dormant, the method further comprising:
determining that the first secondary cell is dormant for communications between the UE and the network device for at least the first duration of time indicated by the secondary cell dormancy configuration for the first secondary cell.

11. The method of claim 1, wherein the indicated dormancy state is active, the method further comprising:
determining that the first secondary cell is active for communications between the UE and the network device for at least the first duration of time indicated by the secondary cell dormancy configuration for the first secondary cell.

12. A method for wireless communication at a network device, comprising:
transmitting, prior to determining a dormancy state of a first secondary cell of a plurality of secondary cells, first signaling indicating a secondary cell dormancy configuration that indicates:
a duration of time for which each of the plurality of secondary cells is to be in a later indicated dormancy state and a default state of each of the plurality of secondary cells, wherein the default state is dormant or active and corresponds to a default behavior a respective secondary cell is to fall back to after the duration of time associated with the respective secondary cell has expired;
transmitting second signaling indicating the dormancy state of the first secondary cell, the dormancy state indicating whether the first secondary cell is currently dormant or active for communications between a user equipment (UE) and the network device, wherein, based at least in part on a discontinuous reception cycle of the UE, the second signaling indicating the dormancy state of the first secondary cell is communicated in one of a wake-up signal or downlink control information on a primary cell or a primary secondary cell, wherein transmission of the second signaling indicating the dormancy state of the first secondary cell indicates to start a timer for the first secondary cell, and wherein the secondary cell dormancy configuration indicates a first duration of time for which the first secondary cell is to be in the indicated dormancy state for the first secondary cell and to fall back to a first default state for the first secondary cell when the timer for the first secondary cell expires; and communicating, for the first duration of time indicated by the secondary cell dormancy configuration for the first secondary cell, based at least in part on the indicated dormancy state of the first secondary cell.

13. The method of claim 12, wherein the first signaling indicating the secondary cell dormancy configuration is radio resource control signaling.

14. The method of claim 12, wherein transmitting the second signaling indicating the dormancy state of the first secondary cell comprises:
   transmitting the wake-up signal in a physical downlink control channel.

15. The method of claim 12, wherein transmitting the second signaling indicating the dormancy state of the first secondary cell comprises:
   transmitting the downlink control information on the primary cell or the primary secondary cell.

16. The method of claim 12, wherein the first duration of time for which the first secondary cell is to be in the indicated dormancy state is a number of on-durations of the discontinuous reception cycle at the UE.

17. The method of claim 12, wherein the first duration of time for which the first secondary cell is to be in the indicated dormancy state is a single, next on-duration of the discontinuous reception cycle at the UE.

18. The method of claim 12, wherein the first duration of time for which the first secondary cell is to be in the indicated dormancy state is until further notice.

19. The method of claim 12, wherein the indicated dormancy state is a first indication and comprises a first dormancy state, the method further comprising:
   transmitting a second indication of a second dormancy state of the first secondary cell, wherein the second indication overrides the first indication.

20. A user equipment (UE) for wireless communication, comprising:
   one or more processors; and
   memory coupled with the one or more processors, the one or more processors configured individually or collectively to cause the UE to:
      receive, from a network device and prior to reception of an indication of a dormancy state of a first secondary cell of a plurality of secondary cells, first signaling indicating a secondary cell dormancy configuration that indicates:
         a duration of time for which each of the plurality of secondary cells is to be in a later indicated dormancy state and a default state of each of the plurality of secondary cells, wherein the default state is dormant or active and corresponds to a default behavior a respective secondary cell is to fall back to after the duration of time associated with the respective secondary cell has expired;
      receive, from the network device, second signaling indicating the dormancy state of the first secondary cell, the dormancy state indicating whether the first secondary cell is currently dormant or active for communications between the UE and the network device, wherein, based at least in part on a discontinuous reception cycle of the UE, the second signaling indicating the dormancy state of the first secondary cell is received in one of a wake-up signal or downlink control information on a primary cell or a primary secondary cell;
      communicate, for a first duration of time indicated by the secondary cell dormancy configuration for the first secondary cell, with the network device based at least in part on the indicated dormancy state of the first secondary cell;
      start a timer for the first secondary cell based at least in part on reception of the second signaling indicating the dormancy state of the first secondary cell, wherein the first duration of time for which the first secondary cell is to be in the indicated dormancy state is configured for the timer; and
      fall back to a first default state indicated by the secondary cell dormancy configuration for the first secondary cell when the timer for the first secondary cell expires.

21. The UE of claim 20, wherein the one or more processors are further configured individually or collectively to cause the UE to:
   determine that the first secondary cell is in the first default state indicated by the secondary cell dormancy configuration for the first secondary cell after the first duration of time has expired.

22. The UE of claim 20, wherein the first signaling indicating the secondary cell dormancy configuration is radio resource control signaling.

23. A network device for wireless communication, comprising:
   one or more processors; and
   memory coupled with the one or more processors, the one or more processors configured individually or collectively to cause the network device to:
      transmit, prior to a determination of a dormancy state of a first secondary cell of a plurality of secondary cells, first signaling indicating a secondary cell dormancy configuration that indicates:
         a duration of time for which each of the plurality of secondary cells is to be in a later indicated dormancy state, and a default state of each of the plurality of secondary cells, wherein the default state is dormant or active and corresponds to a default behavior a respective secondary cell is to fall back to after the duration of time associated with the respective secondary cell has expired;
      transmit second signaling indicating the dormancy state of the first secondary cell, the dormancy state indicating whether the first secondary cell is currently dormant or active for communications between a user equipment (UE) and the network device, wherein, based at least in part on a discontinuous reception cycle of the UE, the second signaling indicating the dormancy state of the first secondary cell is communicated in one of a wake-up signal or downlink control information on a primary cell or a primary secondary cell, wherein transmission of the second signaling indicating the dormancy state of the first secondary cell indicates to start a timer for the first secondary cell, and wherein the secondary cell dormancy configuration indicates a first duration of time for which the first secondary cell is to be in the indicated dormancy state for the first secondary cell and to fall back to a first default state for the first secondary cell when the timer for the first secondary cell expires; and communicate, for the first duration of time indicated by the secondary cell dormancy configuration for the first secondary cell, based at least in part on the indicated dormancy state of the first secondary cell.

24. The network device of claim 23, wherein the first signaling indicating the secondary cell dormancy configuration is radio resource control signaling.

25. The network device of claim 23, wherein, to transmit the second signaling indicating the dormancy state of the first secondary cell, the one or more processors are configured individually or collectively to cause the network device to:

transmit the wake-up signal in a physical downlink control channel.

* * * * *